(12) United States Patent
Iwahashi et al.

(10) Patent No.: US 8,302,571 B2
(45) Date of Patent: Nov. 6, 2012

(54) AIR TO FUEL RATIO CONTROL DEVICE

(75) Inventors: Kazuhiro Iwahashi, Okazaki (JP);
Hiroshi Morita, Obu (JP)

(73) Assignee: Toyota Jidosha Kabushiki Kaisha,
Toyota-shi (JP)

( * ) Notice: Subject to any disclaimer, the term of this patent is extended or adjusted under 35 U.S.C. 154(b) by 825 days.

(21) Appl. No.: 12/517,584

(22) PCT Filed: Dec. 11, 2007

(86) PCT No.: PCT/JP2007/073880
§ 371 (c)(1),
(2), (4) Date: Jun. 4, 2009

(87) PCT Pub. No.: WO2008/072635
PCT Pub. Date: Jun. 19, 2008

(65) Prior Publication Data
US 2010/0070159 A1    Mar. 18, 2010

(30) Foreign Application Priority Data

Dec. 12, 2006  (JP) .................. 2006-334748

(51) Int. Cl.
*F01L 1/34* (2006.01)
*F02D 41/00* (2006.01)

(52) U.S. Cl. ................. 123/90.15; 123/674; 701/104; 701/109

(58) Field of Classification Search ............... 123/90.15, 123/90.16, 90.17, 674; 701/104, 109, 113
See application file for complete search history.

(56) References Cited

U.S. PATENT DOCUMENTS

| 5,850,815 A | 12/1998 | Yano et al. |
| 5,983,629 A | 11/1999 | Sawada |
| 7,360,515 B2 * | 4/2008 | Hoshino ............ 123/90.15 |
| 7,472,697 B2 * | 1/2009 | Morita et al. ......... 123/679 |
| 7,610,898 B2 | 11/2009 | Hiraku et al. |
| 2007/0157896 A1 * | 7/2007 | Fuwa ............ 123/90.16 |

FOREIGN PATENT DOCUMENTS

| JP | 8 210158 | 8/1996 |
| JP | 2569999 | 1/1997 |

(Continued)

*Primary Examiner* — Thomas Moulis
(74) *Attorney, Agent, or Firm* — Oblon, Spivak, McClelland, Maier & Neustadt, L.L.P.

(57) ABSTRACT

An air-fuel ratio control device of an internal combustion engine is provided. The control device includes a learning section, a correction section, and an inhibiting section. When an execution condition is met, the learning section learns, as a deviation amount learned value, a constant deviation amount between a correction amount and its reference value in different manners between a case in which the lift amount of the intake valve is in a first lift amount region used only when the execution condition is not met and a case in which the lift amount is in a second lift amount region used only when the execution condition is met. The learning section computes and stores the relationship between the deviation amount and the lift amount based on the deviation amount learned value. A correction section computes the deviation amount correction value from the stored relationship based on the lift amount, and corrects the fuel injection amount command value using the deviation amount correction value. When there is no record of completing learning of the deviation amount when the lift amount is in the first lift amount region, an inhibiting section inhibits the lift amount from being shifted from the first lift amount region to other lift amount region.

20 Claims, 12 Drawing Sheets

FOREIGN PATENT DOCUMENTS

| | | |
|---|---|---|
| JP | 9 287493 | 11/1997 |
| JP | 2900890 | 6/1999 |
| JP | 2001 263015 | 9/2001 |
| JP | 2002 295290 | 10/2002 |
| JP | 2003-172161 | 6/2003 |
| JP | 2004 11435 | 1/2004 |
| JP | 2004 363696 | 12/2004 |
| JP | 2005 207286 | 8/2005 |
| JP | 2006-63885 | 3/2006 |
| JP | 2006-83734 | 3/2006 |

\* cited by examiner

Fig.15

| VL>VL1 | VL1≧VL>VL2 | VL2≧VL>VL3 | VL3≧VL |
|---|---|---|---|
| First Region | Second Region | Third Region | Fourth Region |
| Learned Value GK1 | Learned Value GK2 | Learned Value GK3 | Learned Value GK4 |

AIR TO FUEL RATIO CONTROL DEVICE

FIELD OF THE INVENTION

The present invention relates to an air-fuel ratio control device that executes air-fuel ratio control and is applied to an internal combustion engine provided with a variable valve lift mechanism, which changes the lift amount of an intake valve.

BACKGROUND OF THE INVENTION

In an internal combustion engine, exhaust gas components are generally purified by an exhaust gas purifying catalyst provided in an exhaust passage. The exhaust gas purifying catalyst efficiently purifies the exhaust gas components when the air-fuel ratio of the air-fuel mixture that is burned in the internal combustion engine is within a predetermined range. Therefore, a sensor, which outputs a signal corresponding to the oxygen concentration in the exhaust gas, is provided in the exhaust passage. The actual air-fuel ratio of the air-fuel mixture is detected based on the signal output from the sensor. Then, air-fuel ratio control that feedback controls the fuel injection amount is executed such that the detected actual air-fuel ratio becomes equal to a target air-fuel ratio.

The feedback control is executed when a predetermined execution condition is met, for example, when the temperature of the internal combustion engine has become sufficiently high after starting operation of the internal combustion engine. When the execution condition is not met, prediction control is executed based on the operating condition of the internal combustion engine to adjust the fuel injection amount regardless of the output signal from the sensor.

Patent Document 1 discloses a device applied to an internal combustion engine provided with a variable valve lift mechanism, which changes the lift amount (more specifically, the maximum lift amount) of an intake valve. In such a device, the variable valve lift mechanism is controlled to make the actual lift amount equal to a desired lift amount. Accordingly, the intake valve is selectively opened and closed such that the lift amount of the intake valve becomes a value appropriate for the current operating condition of the engine.

The lift amount of the intake valve slightly differs among engines due to, for example, assembly errors. Thus, the passage area of a communication portion between an intake passage and a combustion chamber in the internal combustion engine slightly differs from the reference area. Also, when deposit collects on the intake valve as the engine is operated, the passage area is changed, increasing the difference between the passage area and the reference area. The difference of the passage area from the reference area reduces the adjusting accuracy of the intake amount, that is, the adjusting accuracy of the air-fuel ratio of the air-fuel mixture. In the internal combustion engine in which the above-mentioned feedback control is executed, the variation of the air-fuel ratio due to the difference between the passage area and the reference area is basically compensated for through the feedback control, thereby avoiding reduction in the adjusting accuracy of the air-fuel ratio.

However, in the internal combustion engine provided with the variable valve lift mechanism, when the passage area differs from the reference area, the variation of the air-fuel ratio due to the difference differs depending on the operating manner of the variable valve lift mechanism. Thus, when the operating manner of the variable valve lift mechanism is changed frequently so as to be appropriate for the current engine operating condition, the variation of the air-fuel ratio is also frequently changed in accordance with the change.

When the feedback control is executed based simply on the signal from the sensor as in the device of Patent Document 1, it may not be possible to follow the frequent change in the operating manner of the variable valve lift mechanism. As a result, it may be impossible to accurately compensate for the variation of the air-fuel ratio accompanying the change in the operating manner of the variable valve lift mechanism.

In particular, since the feedback control is not executed when the execution condition is not met, if the fuel injection amount adjusted by the prediction control deviates from the amount corresponding to the passage area, the actual air-fuel ratio deviates from the target air-fuel ratio, causing the exhaust gas property to become constantly poor.

Such deterioration of the exhaust gas property can be suppressed by the following learning process. That is, during the execution of the feedback control, the constant deviation amount between the correction amount set in the lift amount region used when the execution condition is not met and the reference value is learned as a learned value. Then, the prediction control based on the learned value is executed when the feedback control is not executed.

However, if the learned value is unnecessarily reset due to, for example, replacement of the battery, the state in which the exhaust gas property is poor continues thereafter for a long period of time until the learned value is updated to an appropriate value.

Patent Document 1: Japanese Laid-Open Patent Publication No. 2001-263015

SUMMARY OF THE INVENTION

Accordingly, it is an objective of the present invention to provide an air-fuel ratio control device that accurately controls the air-fuel ratio of an air-fuel mixture to a desired value in an internal combustion engine provided with a variable valve lift mechanism.

To achieve the above objective, one aspect of the present invention provides an air-fuel ratio control device of an internal combustion engine. The engine includes a variable valve lift mechanism, which changes the lift amount of an intake valve, and a sensor, which outputs a signal corresponding to the oxygen concentration in exhaust gas. When an execution condition is not met after operation of the engine has been started, the control device sets a fuel injection amount command value through a prediction control based on the operating condition of the engine. When the execution condition is met, the control device sets the fuel injection amount command value through a feedback control using a correction amount computed based on the output value of the sensor. The control device includes a learning section, a correction section, and an inhibiting section. When the execution condition is met, the learning section learns the constant deviation amount between the correction amount and its reference value as a deviation amount learned value separately for a case in which the lift amount is in a first lift amount region used only when the execution condition is not met and a case in which the lift amount is in a second lift amount region used only when the execution condition is met. The learning section computes and stores the relationship between the deviation amount and the lift amount based on the deviation amount learned value. The correction section computes the deviation amount correction value from the stored relationship based on the lift amount, and corrects the fuel injection amount command value using the deviation amount correction value. When there is no record of completing learning of the deviation amount when the lift amount is in the first lift amount region, the inhibiting section inhibits the lift amount from being shifted from the first lift amount region to other lift amount region.

BRIEF DESCRIPTION OF THE DRAWINGS

FIG. 15 is a graph showing the relationship between the lift amount of the intake valve and the deviation amount learned value according to a second embodiment of the present invention;

DETAILED DESCRIPTION OF THE PREFERRED EMBODIMENTS

A first embodiment of the present invention will now be described.

Figure 1:
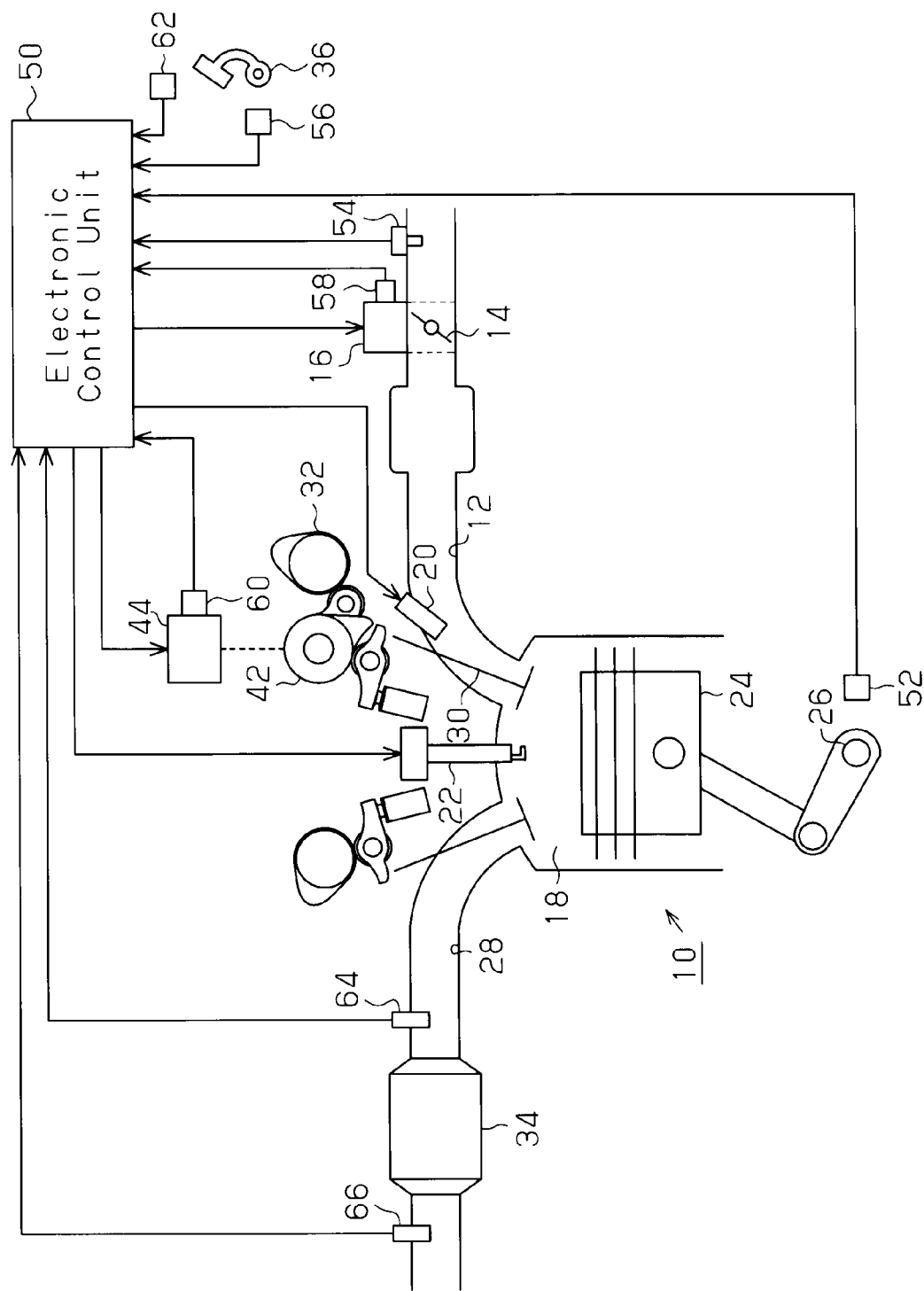
FIG. 1 is a schematic diagram illustrating an air-fuel ratio control device according to a first embodiment of the present invention.

FIG. 1 shows a schematic configuration of an air-fuel ratio control device according to the first embodiment.

As shown in FIG. 1, an intake passage 12 of an internal combustion engine 10 is provided with a throttle valve 14. A throttle motor 16 is connected to the throttle valve 14. The opening degree of the throttle valve 14 (throttle opening degree TA) is adjusted by controlling the throttle motor 16, thereby adjusting the amount of air taken into a combustion chamber 18 through the intake passage 12. The intake passage 12 is also provided with a fuel injection valve 20. The fuel injection valve 20 injects fuel into the intake passage 12. Furthermore, an exhaust passage 28 of the internal combustion engine 10 is provided with an exhaust gas purifying catalyst 34.

In the combustion chamber 18 of the internal combustion engine 10, air-fuel mixture formed of intake air and injection fuel is ignited by a spark plug 22. The ignition operation causes the air-fuel mixture to burn and a piston 24 to reciprocate, causing a crankshaft 26 to rotate. Then, the burned air-fuel mixture is discharged from the combustion chamber 18 to the exhaust passage 28 as exhaust gas, and the exhaust gas is discharged out of the exhaust passage 28 after being purified by the exhaust gas purifying catalyst 34. FIG. 1 shows one of cylinders of the engine 10.

Figure 2:
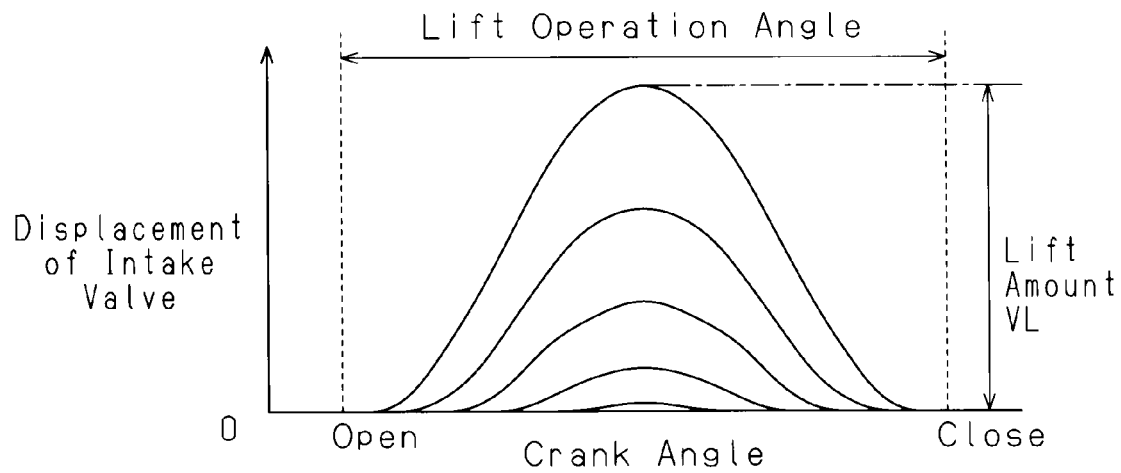
FIG. 2 is a graph showing displacement of the lift amount of the intake valve based on operation of the variable valve lift mechanism.

In the internal combustion engine 10, the intake passage 12 and the combustion chamber 18 are selectively connected and disconnected by opening or closing an intake valve 30. The intake valve 30 is opened and closed by rotation of an intake camshaft 32 to which rotation of the crankshaft 26 is transmitted. A variable valve lift mechanism 42 is provided between the intake valve 30 and the intake camshaft 32. The variable valve lift mechanism 42 changes the lift amount VL (more specifically, the maximum lift amount) of the intake valve 30 in accordance with the engine operating condition, and is actuated by an actuator 44 such as an electric motor. As shown in FIG. 2, by the operation of the variable valve lift mechanism 42, the lift amount VL of the intake valve 30 is changed in synchronization with the valve opening period, that is, the lift operation angle. For example, the smaller the lift operation angle, the smaller the lift amount VL becomes.

The device of the first embodiment includes various sensors for detecting operating condition of the internal combustion engine 10 shown in FIG. 1. The various sensors include, for example, a crank sensor 52 for detecting the rotational speed of the crankshaft 26 (engine speed NE), an intake air amount sensor 54 for detecting the amount of intake air flowing through the intake passage 12 (passage intake air amount GA), and a depression amount sensor 56 for detecting the depression amount AC of an accelerator pedal 36. Also, the various sensors include a throttle sensor 58 for detecting the throttle opening degree TA, a lift amount sensor 60 for detecting the lift amount VL of the intake valve 30 (more specifically, the operation amount of the variable valve lift mechanism 42), and a temperature sensor 62 for detecting the temperature of the engine coolant (coolant temperature degree THW). Furthermore, the various sensors include an air-fuel ratio sensor 64, which is located at a section upstream of the exhaust gas purifying catalyst 34 in the exhaust gas flowing direction in the exhaust passage 28, or more specifically, in an exhaust manifold. The air-fuel ratio sensor 64 outputs a signal corresponding to the oxygen concentration in the exhaust gas. In addition, the various sensors include an oxygen sensor 66, which is located in the exhaust passage 28 downstream of the exhaust gas purifying catalyst 34 in the exhaust gas flowing direction and outputs a signal corresponding to the oxygen concentration in the exhaust gas.

Figure 3:
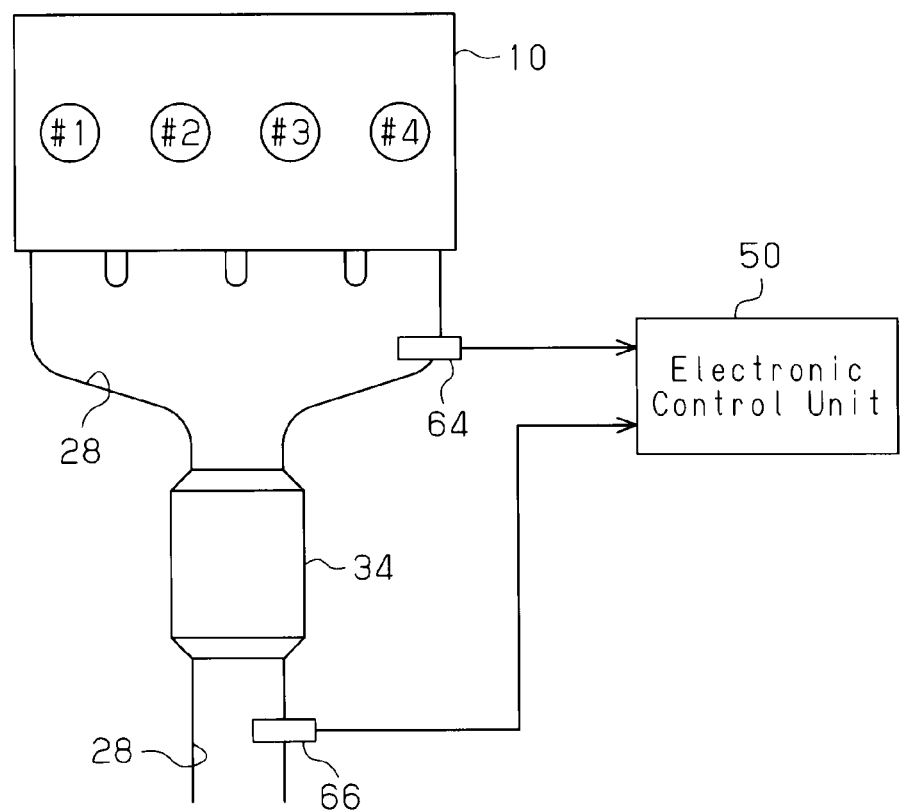
FIG. 3 is a diagram illustrating the position of the air-fuel ratio sensor and the oxygen sensor in the exhaust passage.

As shown in FIG. 3, the internal combustion engine 10 includes first to fourth cylinders #1, #2, #3, and #4, and the air-fuel ratio sensor 64 is provided at the portion where the exhaust passages 28 extending from the cylinders #1 to #4 join together, more specifically, in the exhaust manifold.

The air-fuel ratio sensor 64 is a known limiting current type oxygen sensor. The limiting current type oxygen sensor is configured by providing a ceramic layer, called a diffusion-controlled layer, in a detection portion of a concentration cell type oxygen sensor. The limiting current type oxygen sensor outputs current corresponding to the oxygen concentration in the exhaust gas. When the air-fuel ratio of the air-fuel mixture, which is closely related to the oxygen concentration in the exhaust gas, equals the stoichiometric air-fuel ratio, the output current from the air-fuel ratio sensor 64 is 0. Also, as the air-fuel ratio of the air-fuel mixture becomes richer, the output current increases in the negative direction, and as the air-fuel ratio becomes leaner, the output current increases in the positive direction. Therefore, the degree by which the air-fuel ratio of the air-fuel mixture becomes lean or rich is detected based on the output signal from the air-fuel ratio sensor 64.

The oxygen sensor 66 is a known concentration cell type oxygen sensor. When the oxygen concentration in the exhaust gas is a value at which the air-fuel ratio of the air-fuel mixture is richer than the stoichiometric air-fuel ratio, the oxygen sensor 66 outputs a voltage of approximately 1 bolt, and when the concentration is a value at which the air-fuel ratio of the air-fuel mixture is leaner than the stoichiometric air-fuel ratio, the oxygen sensor 66 outputs a voltage of approximately 0 bolt. The output voltage from the oxygen sensor 66 largely changes when the oxygen concentration of the exhaust gas is a value at which the air-fuel ratio of the air-fuel mixture is at or around the stoichiometric air-fuel ratio. Thus, it is possible to determine, based on the output signal from the oxygen sensor 66, whether the properties of the exhaust gas present downstream of the exhaust gas purifying catalyst 34 correspond to a lean air-fuel ratio or a rich air-fuel ratio.

The oxygen sensor 66 is provided downstream of the exhaust gas purifying catalyst 34 in order to monitor the condition of the exhaust purifying operation of the exhaust gas purifying catalyst 34. That is, when the reducing operation in the exhaust gas purifying catalyst 34 is promoted and oxygen is released into the exhaust gas, the output signal from the oxygen sensor 66 indicates a value corresponding to a lean air-fuel ratio. When the oxidizing operation in the exhaust gas purifying catalyst 34 is promoted and oxygen in the exhaust gas is consumed, the output signal from the oxygen sensor 66 indicates a value corresponding to a rich air-fuel ratio. The condition of the exhaust gas purifying operation is monitored based on the detection results of the oxygen sensor 66.

The device of the first embodiment is provided with, for example, an electronic control unit 50 including a microcomputer. The electronic control unit 50 receives detection signals from various sensors, and performs various computations. Based on the computation results, the electronic control unit 50 performs various controls such as the drive control of the throttle motor 16 (throttle control), the drive control of the fuel injection valve 20 (fuel injection control), and the drive control of the actuator 44 (variable valve lift control).

In the first embodiment, the amount of air taken into the combustion chamber 18 (the amount of air taken in the cylinder) is adjusted as follows by the combination of the throttle control and the variable valve lift control. That is, a control target value for the amount of air taken in the cylinder (target cylinder intake air amount Tga) is computed based on the depression amount AC of the accelerator pedal 36 and the engine speed NE. Then, the throttle control and the variable valve lift control are performed so that the actual cylinder intake air amount becomes equal to the target cylinder intake air amount Tga.

If the internal combustion engine 10 has not been sufficiently warmed (more specifically, when the coolant temperature THW is lower than a predetermined temperature) when executing the throttle control and the variable valve lift control, the lift amount VL is fixed at a control limit lift amount at which the lift amount is large (upper limit lift amount VLmax), while the throttle opening degree TA is changed to adjust the cylinder intake air amount.

If the internal combustion engine 10 has been sufficiently warmed (more specifically, when the coolant temperature is higher than or equal to the predetermined temperature), both of the throttle opening degree TA and the lift amount VL are changed to adjust the cylinder intake air amount. As compared to an internal combustion engine in which the intake air amount is adjusted only by changing the opening degree of the throttle valve, the internal combustion engine in which the intake air amount is adjusted by changing the lift amount of the intake valve reduces the pumping loss when the required intake air amount is small, and thus reduces the fuel consumption by the corresponding amount. Taking this point into consideration, in the first embodiment, basically when the internal combustion engine 10 has been sufficiently warmed, the smaller the cylinder intake air amount appropriate for the operating condition of the internal combustion engine (the estimated cylinder intake air amount Vga described below), the smaller the lift amount VL and the throttle opening degree TA of the intake valve 30 are set.

In the first embodiment, the fuel injection amount is adjusted in accordance with the estimated cylinder intake air amount Vga by the fuel injection control. Hereinafter, the fuel injection control will be described.

Figure 4:
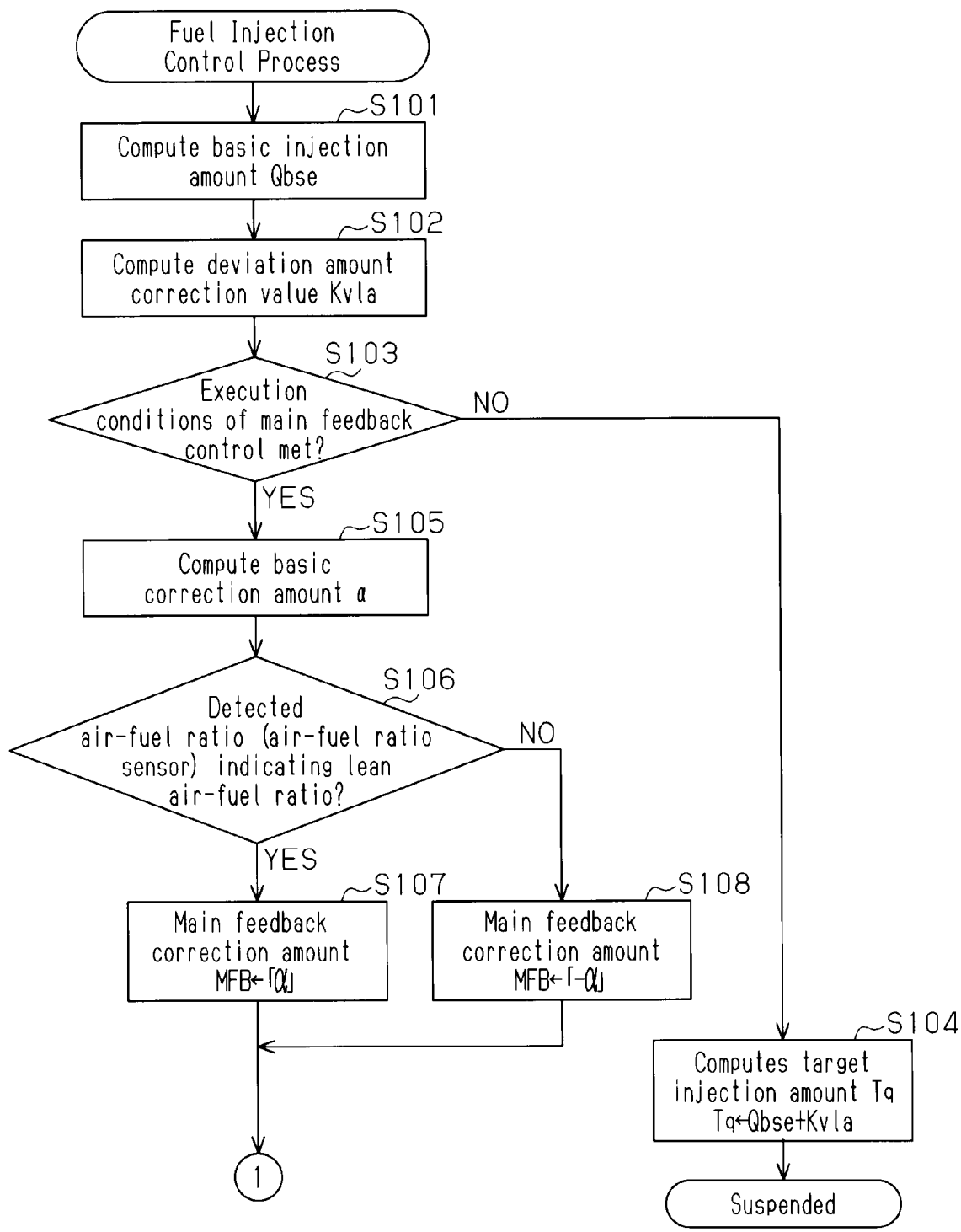
FIG. 4 is a flowchart showing a fuel injection control process according to the first embodiment.
Figure 5:
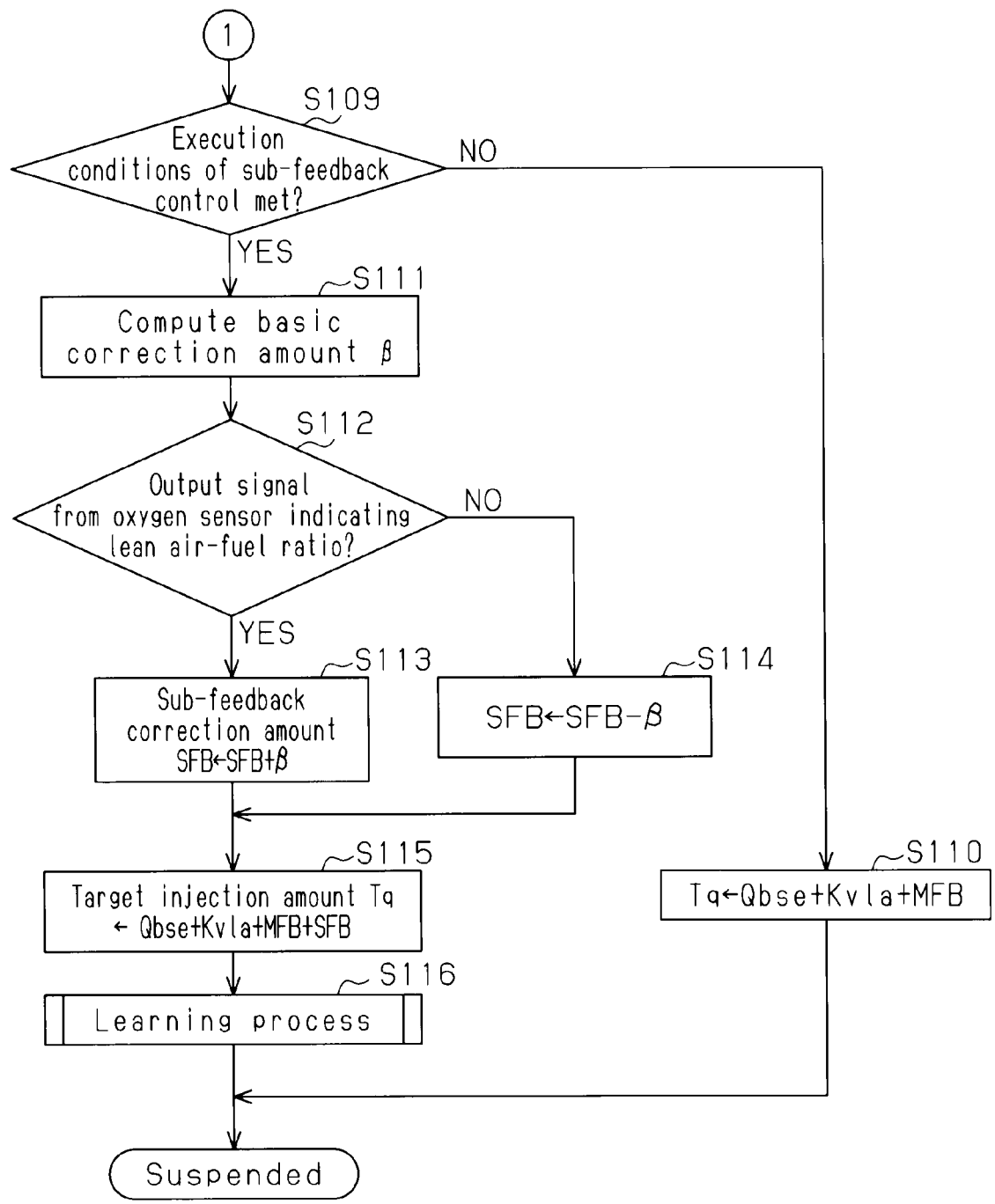
FIG. 5 is a flowchart showing a fuel injection control process according to the first embodiment.

FIGS. 4 and 5 are flowcharts showing specific procedure of the fuel injection control, and the routine shown in the flowcharts is performed by the electronic control unit 50 at a predetermined cycle.

As shown in FIG. 4, first, the estimated cylinder intake air amount Vga is computed based on the passage intake air amount GA, and a basic injection amount Qbse is computed based on the estimated cylinder intake air amount Vga (step S101). The basic injection amount Qbse is a value corresponding to the prediction control amount in the fuel injection control. The fuel injection amount at which the air-fuel ratio of the air-fuel mixture burned in the combustion chamber 18 becomes equal to the stoichiometric air-fuel ratio is computed as the basic injection amount Qbse for the estimated cylinder intake air amount Vga.

A deviation amount correction value Kvla is computed based on the lift amount VL (step S102). The specific computation manner of the deviation amount correction value Kvla, and the operations achieved by computing the deviation amount correction value Kvla will be described below.

Next, it is determined whether execution conditions of main feedback control (feedback control of a fuel injection amount command value based on the output value of the air-fuel ratio sensor 64) are met (step S103). In the first embodiment, the execution conditions are determined to be met when the following conditions are met.

The internal combustion engine 10 has been warmed.

The air-fuel ratio sensor 64 is sufficiently activated.

When the execution conditions are not met (the decision outcome of step S103 is negative), a value obtained by adding the deviation amount correction value Kvla to the basic injection amount Qbse (=Qbse+Kvla) is set as the fuel injection amount command value (a target injection amount Tq) at step S104. Thereafter, the routine is temporarily suspended. In this case, the target injection amount Tq is set by the prediction control based on the engine operating condition. Then, the air-fuel ratio of the air-fuel mixture is brought closer to the stoichiometric air-fuel ratio by driving the fuel injection valve 20 such that the fuel is injected by the amount equal to the target injection amount Tq.

When the execution conditions are met (the decision outcome of step S103 is positive), the air-fuel ratio sensor 64 detects the actual air-fuel ratio of the air-fuel mixture, and a basic correction amount a is computed based on the difference between the actual air-fuel ratio and the target air-fuel ratio (the stoichiometric air-fuel ratio in the first embodiment) at step S105. The greater the difference, the greater the value computed as the basic correction amount a becomes.

When the air-fuel ratio detected by the air-fuel ratio sensor 64 is a value indicating a lean air-fuel ratio (the decision outcome of step S106 is positive), the basic correction amount a is set as a main feedback correction amount MFB (step S107). When the air-fuel ratio detected by the air-fuel ratio sensor 64 is a value indicating a rich air-fuel ratio (the decision outcome of step S106 is negative), a value ($-\alpha$) obtained by multiplying the basic correction amount a by $-1.0$ is set as the main feedback correction amount MFB (step S108).

After the main feedback correction amount MFB is set, it is determined whether execution conditions of a sub-feedback control (the feedback control of the target injection amount Tq based on the output value of the oxygen sensor 66) are met as shown in FIG. 5 (step S109). In the first embodiment, the execution conditions are determined to be met when the following conditions are met.

The exhaust gas purifying catalyst 34 is sufficiently activated.

The oxygen sensor 66 is sufficiently activated.

Then, when the execution conditions are not met (the decision outcome of step S109 is negative), a value obtained by adding the deviation amount correction value Kvla and the main feedback correction amount MFB to the basic injection amount Qbse is computed as the target injection amount Tq (=Qbse+Kvla+MFB) at step S110. Then, the routine is temporarily suspended. In this case, the target injection amount Tq is set by the prediction control and the main feedback control.

When combustion is performed around the stoichiometric air-fuel ratio, the exhaust gas purifying catalyst 34 oxidizes HC and CO in the exhaust gas and reduces NOx in the exhaust gas, thereby purifying the exhaust gas. Specifically, when the air-fuel ratio of the air-fuel mixture is within a narrow range (window) in which the air-fuel ratio is around the stoichiometric air-fuel ratio, the exhaust gas purifying catalyst 34 efficiently purifies all the main pollutants (HC, CO, NOx) in the exhaust gas. Thus, the air-fuel ratio of the air-fuel mixture needs to be accurately adjusted so that the air-fuel ratio becomes equal to the center of the window to have the exhaust gas purifying catalyst 34 to effectively function. At this time (when the decision outcome of step S109 is negative), the fuel injection amount is adjusted so that the actual air-fuel ratio becomes equal to the target air-fuel ratio by the main feedback control.

When the execution conditions are met (the decision outcome of step S109 is positive), the basic correction amount $\beta$ is computed (step S111) based on the difference between the actual oxygen concentration of the exhaust gas detected by the oxygen sensor 66 and the reference concentration (the concentration when the air-fuel ratio of the air-fuel mixture is at the stoichiometric air-fuel ratio, and the concentration when the output voltage of the oxygen sensor 66 is 0.5 V). The greater the difference, the greater the basic correction amount $\beta$ becomes.

When the output signal of the oxygen sensor 66 is a value indicating a lean air-fuel ratio (the decision outcome of step S112 is positive), a value obtained by adding the basic correction amount $\beta$ to a stored sub-feedback correction amount SFB (SFB+$\beta$) is set as a new sub-feedback correction amount SFB (step S113). When the output signal from the oxygen sensor 66 is a value indicating a rich air-fuel ratio (the decision outcome of step S112 is negative), a value obtained by subtracting the basic correction amount $\beta$ from the stored sub-feedback correction amount SFB (SFB-$\beta$) is set as the new sub-feedback correction amount SFB (step S114).

After the sub-feedback correction amount SFB is set as described above, a value obtained by adding the deviation amount correction value Kvla, the main feedback correction amount MFB, and the sub-feedback correction amount SFB to the basic injection amount Qbse is computed as the target injection amount Tq (=Qbse+Kvla+MFB+SFB) at step S115. Therefore, in this case (when the decision outcome of step S109 is positive), the target injection amount Tq is set by the prediction control, the main feedback control, and the sub-feedback control. Accordingly, in addition to adjusting the fuel injection amount by the main feedback control such that the actual air-fuel ratio becomes equal to the target air-fuel ratio, the fuel injection amount is adjusted in accordance with the actual purifying state of the exhaust gas purifying catalyst 34 by the sub-feedback control, and the purifying operation of the exhaust gas purifying catalyst 34 is properly exerted.

Then, after the learning process described below is executed (step S116), the routine is temporarily suspended.

The learning process is executed for the following reasons.

In the internal combustion engine 10, the passage area of the communication portion between the intake passage 12 and the combustion chamber 18 differs from the reference area due to individual differences, over time degradation, and assembly errors of the variable valve lift mechanism 42, or deposit collected on the intake valve 30. Thus, even if the lift amount VL of the intake valve 30 is adjusted in the same manner, the actual cylinder intake air amount does not becomes equal to the cylinder intake air amount of when the passage area is equal to the reference area. In the first embodiment, basically, the variation of the cylinder intake air amount due to the difference of the passage area is compensated for by adjusting the air-fuel ratio.

When the passage area differs from the reference area, the variation of the cylinder intake air amount due to the difference differs largely in accordance with the operating manner (lift amount VL) of the variable valve lift mechanism 42. The reason will now be described.

Figure 6:
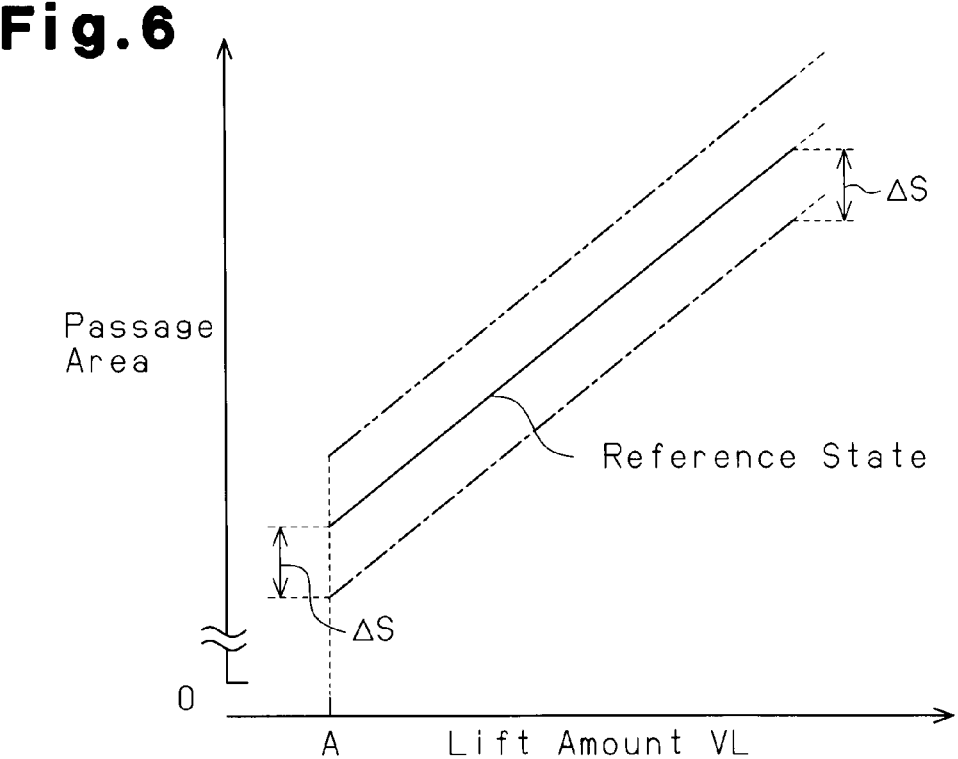
FIG. 6 is a graph showing the relationship between the lift amount of the intake valve and the passage area of the communication portion.

FIG. 6 shows the relationship between the lift amount VL of the intake valve 30 and the passage area. In FIG. 6, the solid line shows the state where the passage area is equal to the reference area, that is, one example of the relationship between the lift amount VL and the passage area in the reference state. In FIG. 6, the alternate long and short dash line shows one example of the relationship between the lift amount VL and the passage area when the passage area is smaller than the reference area, the alternate long and two short dashes line shows one example of the relationship between the lift amount VL and the passage area when the passage area is larger than the reference area.

Figure 7:
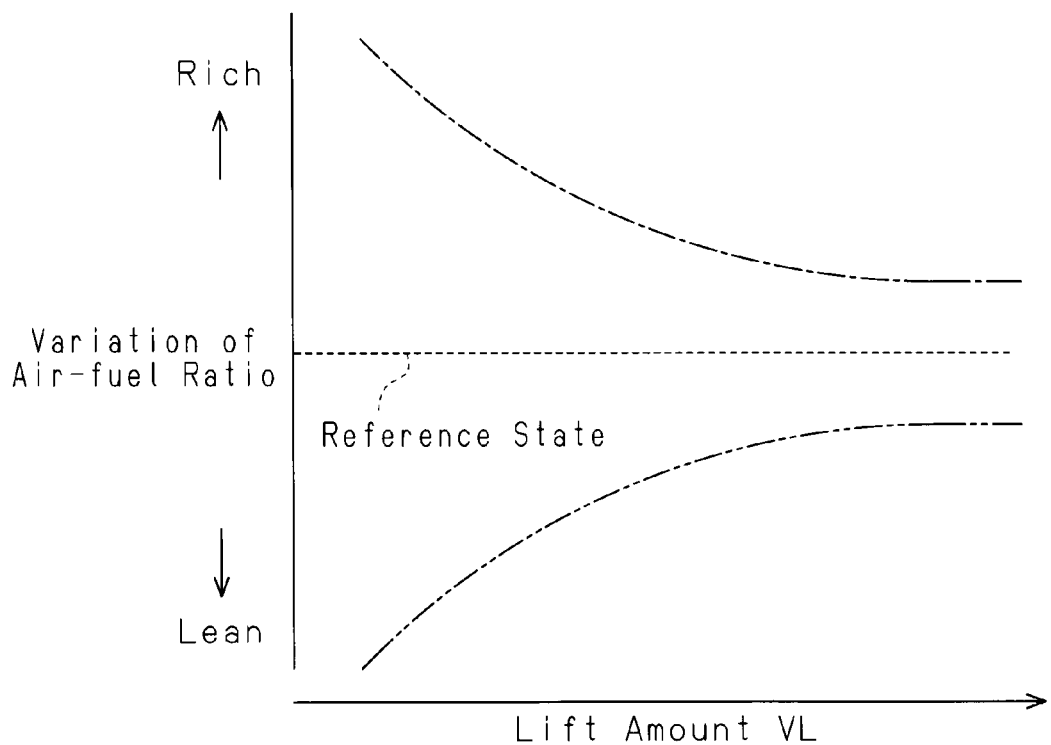
FIG. 7 is a graph showing the relationship between the lift amount of the intake valve and the variation of the air-fuel ratio.

In the first embodiment, since the cylinder intake air amount is adjusted by changing the lift amount VL of the intake valve 30, for example, during low load operation of the internal combustion engine 10 such as during idle operation, the lift amount VL is set small, thereby making the passage area to become very small. As apparent from FIG. 6, the smaller the lift amount VL, the greater the ratio of the difference 1S between the passage area and its reference area to the entire passage area becomes. Thus, when the passage area differs from the reference area, the influence becomes greater as the lift amount VL of the intake valve 30 becomes smaller. More specifically, since the changing degree of the cylinder intake air amount is increased as the lift amount VL of the intake valve 30 is reduced, variation of the air-fuel ratio is increased in both cases in which the passage area is small (the alternate long and short dash line in FIG. 7) and the passage area is large (the alternate long and two short dashes line in FIG. 7) as shown in FIG. 7.

In the first embodiment, since the lift amount VL of the intake valve 30 is frequently changed in accordance with the current operating condition of the engine, the variation of the air-fuel ratio is frequently changed accordingly. Thus, it may not be possible to follow the change due to the frequent variation of the air-fuel ratio by executing only the main feedback control based on the main feedback correction amount MFB and the sub-feedback control based on the sub-feedback correction amount SFB, and the variation might not be accurately compensated for.

In the first embodiment, the relationship between the constant deviation amount from the reference value of the sub-feedback correction amount SFB (more specifically, 0) and the lift amount VL of the intake valve 30 is learned through the learning process (step S116 of FIG. 5). Then, from the learned relationship, the deviation amount correction value Kvla is computed based on the lift amount VL (step S102 of FIG. 4), and the target injection amount Tq is corrected by using the deviation amount correction value Kvla (step S104, steps S110, S115 of FIG. 5). In the first embodiment, the learning process corresponds to the process executed by a learning section, and the processes of steps S102, S104 of FIG. 4 and steps S110, S115 of FIG. 5 correspond to the processes executed by a correction section.

The learning process will be described in detail below.

Figure 8:
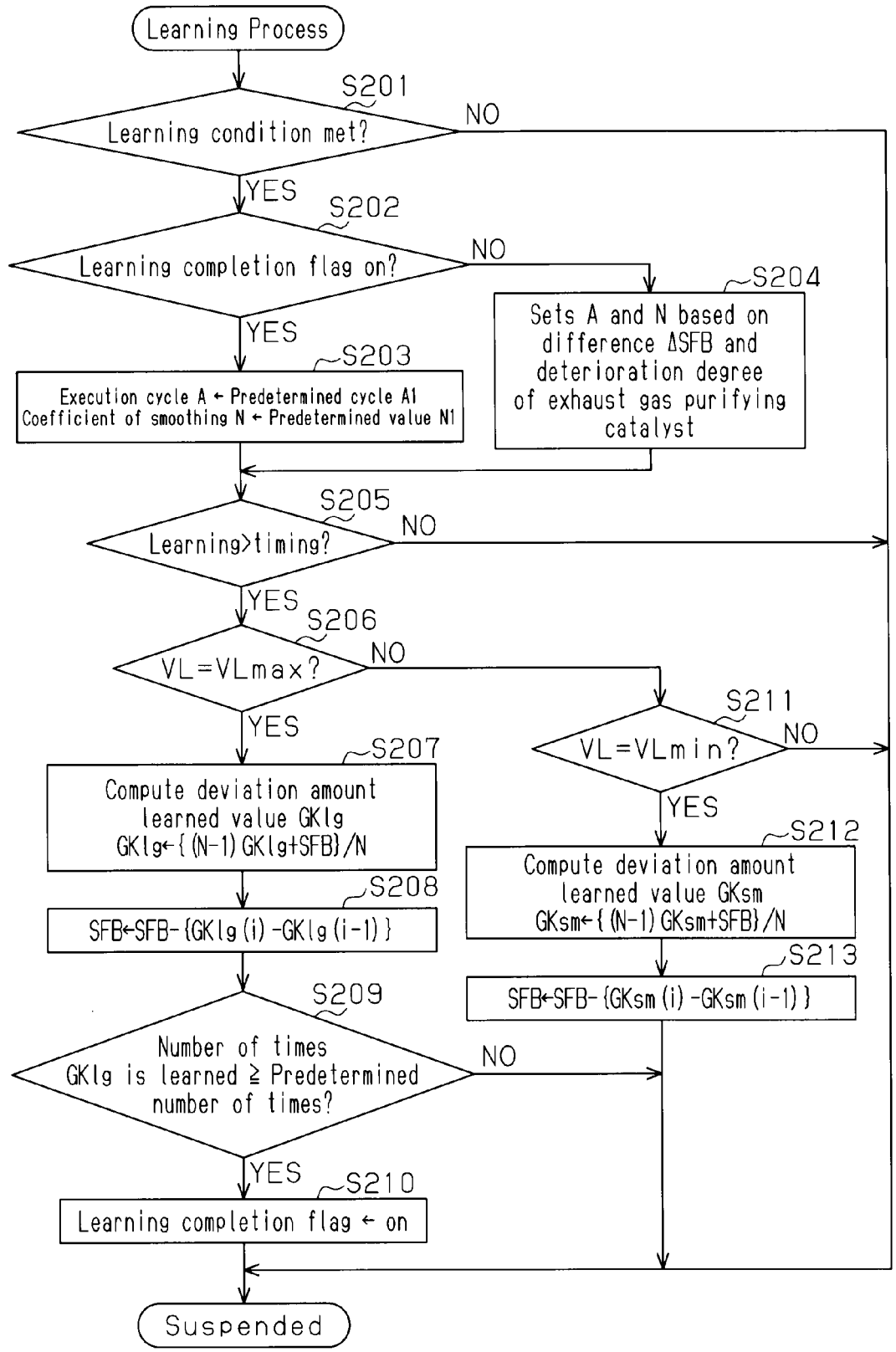
FIG. 8 is a flowchart showing a learning process according to the first embodiment.

FIG. 8 is a flowchart showing the specific procedure of the learning process, the routine shown in the flowchart is executed by the electronic control unit 50 at a predetermined cycle.

First, it is determined whether a learning condition is met (step S201) as shown in FIG. 8. More specifically, it is determined that the learning condition is met if a stable engine operating state, where neither sudden acceleration nor sudden deceleration is performed, has been continued for a predetermined time period.

If it is determined that the learning condition is met (the decision outcome of step S201 is positive), it is determined whether a learning completion flag is on (step S202). In this routine, the deviation amount is learned when the lift amount VL of the intake valve 30 is at the control limit lift amount at which the lift amount is large (upper limit lift amount VLmax) and at the control limit lift amount at which the lift amount is small (lower limit lift amount VLmin). The learning completion flag is turned on when learning of the deviation amount at the upper limit lift amount VLmax is completed. The learning completion flag is turned off when, for example, electric power supply to the electronic control unit 50 is temporarily stopped such as by replacing batteries or by an instantaneous break of the electric cable, and values stored in the electronic control unit 50 are reset to the initial values. In the first embodiment, the upper limit lift amount VLmax corresponds to a first lift amount region and a first specific lift amount, and the lower limit lift amount VLmin corresponds to a second lift amount region and a second specific lift amount.

When the learning completion flag is on (the decision outcome of step S202 is positive), a predetermined cycle A1 is set as an execution cycle A with which learning of the deviation amount is executed, and a predetermined value N1 is set as a coefficient (coefficient of smoothing N) specifying the changing speed of a learned value in this learning (step S203). In the first embodiment, the predetermined cycle A1 (for example, the number of fuel injections=1000 times) and the predetermined value N1 (for example, 10) that avoid erroneous learning and allow completion of the learning at an early stage are obtained based on experimental results and stored. Also, in the first embodiment, a positive number greater than 1.0 is set as the coefficient of smoothing N.

When the learning completion flag is off (the decision outcome of step S202 is negative), the execution cycle A and the coefficient of smoothing N are set based on the difference ΔSFB (the absolute value of the sub-feedback correction amount SFB) between the sub-feedback correction amount SFB and the reference value (more specifically, 0) and the deterioration degree of the exhaust gas purifying catalyst 34 (step S204). In the first embodiment, the process of step S204 corresponds to the process executed by a setting section.

Figure 9:
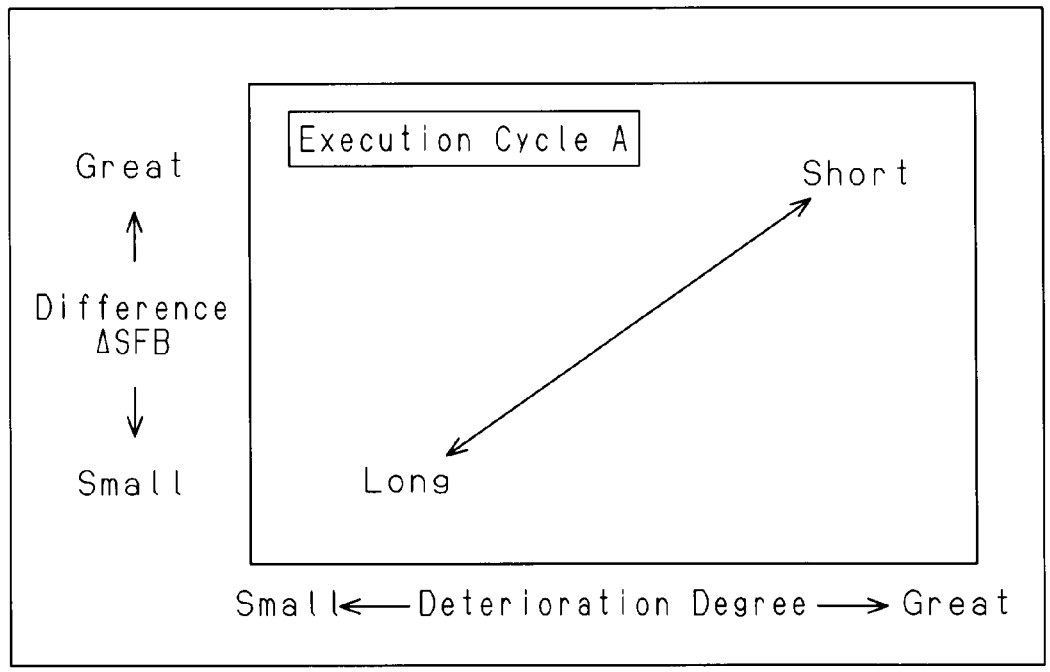
FIG. 9 is a diagram showing the relationship between the deterioration degree of the exhaust gas purifying catalyst and the difference.
Figure 10:
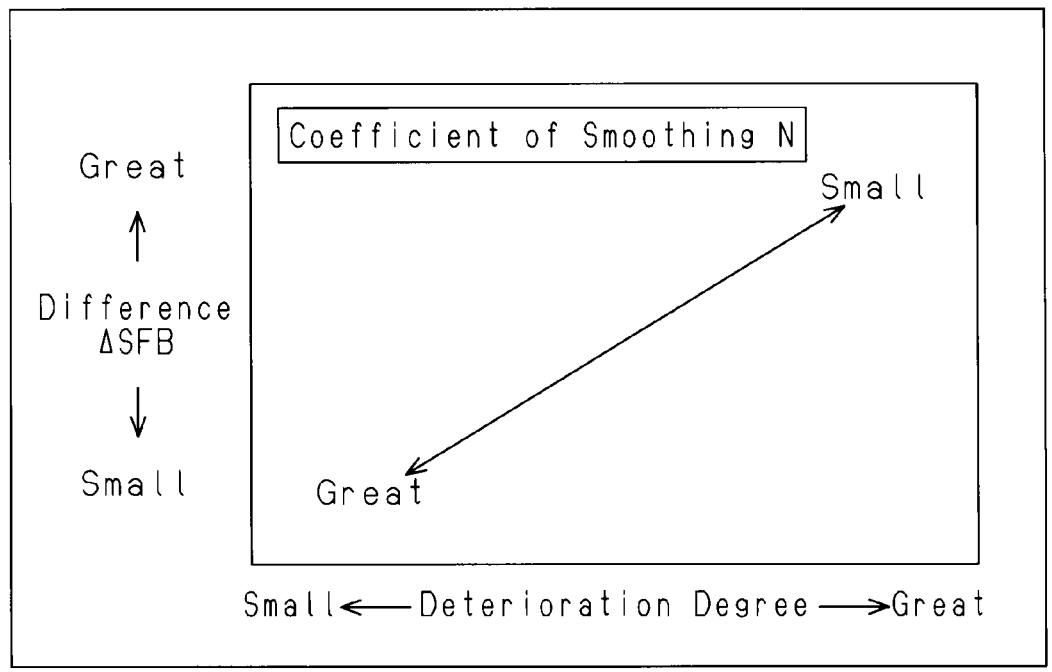
FIG. 10 is a diagram showing the relationship among the deterioration degree of the exhaust gas purifying catalyst, the difference, and the coefficient of smoothing.

As shown in FIG. 9, the execution cycle A is set shorter as the difference ΔSFB and the deterioration degree of the exhaust gas purifying catalyst 34 become greater. Also, a cycle shorter than the predetermined cycle A1 is set as the execution cycle A at this time. As the difference ΔSFB and the deterioration degree of the exhaust gas purifying catalyst 34 become greater, the coefficient of smoothing N is set smaller as shown in FIG. 10. Also, a value smaller than the predetermined value N1 is set as the coefficient of smoothing N at this time.

In this process, by setting the execution cycle A and the coefficient of smoothing N as described above, the changing speed of the deviation amount learned value GKlg at the upper limit lift amount VLmax is set higher when the learning completion flag is off than when the flag is turned on.

In the first embodiment, since the amount of oxygen that can be stored is reduced as the exhaust gas purifying catalyst 34 deteriorates, the oxygen storage capacity of the exhaust gas purifying catalyst 34 is detected and it is determined that the deterioration degree of the exhaust gas purifying catalyst 34 is increased as the oxygen storage capacity is reduced.

The oxygen storage capacity of the exhaust gas purifying catalyst 34 is detected and stored by executing the following process on condition that the internal combustion engine 10 is operated in a relatively high load and stable state (for example, the passage intake air amount GA has been within a predetermined range for a predetermined time period) during the execution of the main feedback control and the sub-feedback control. That is, first, the target injection amount Tq is increased (or decreased) by a predetermined amount such that the output signals from the air-fuel ratio sensor 64 and the oxygen sensor 66 are both shifted from values corresponding to the lean air-fuel ratio to values corresponding to the rich air-fuel ratio (or from values corresponding to the rich air-fuel ratio to values corresponding to the lean air-fuel ratio). Then, the time required from when the output signal of the air-fuel ratio sensor 64 is shifted to when the output signal of the oxygen sensor 66 is shifted is detected. The longer the detected time, the smaller the value detected as the oxygen storage capacity of the exhaust gas purifying catalyst 34 is.

After the execution cycle A and the coefficient of smoothing N are set in accordance with the manipulation state of the learning completion flag as described above, the process for learning the deviation amount is executed (steps S206 to S213) if it is the time for learning in each execution cycle A (the decision outcome of step S205 of FIG. 8 is positive).

More specifically, when the lift amount VL of the intake valve 30 is at the upper limit lift amount VLmax (the decision outcome of step S206 is positive), the deviation amount learned value GKlg is computed based on the stored deviation amount learned value GKlg, the sub-feedback correction amount SFB, and the coefficient of smoothing N using the following relational expression (step S207).

$$GKlg \leftarrow \{(N-1)GKlg + SFB\}/N$$

Also, in addition to the computation of the deviation amount learned value GKlg, the difference {GKlg(i)−GKlg(i−1)} between the currently computed deviation amount learned value GKlg(i) and the deviation amount learned value GKlg(i−1) that was computed when this process was executed last time is subtracted from the sub-feedback correction amount SFB, and the resultant is set as a new sub-feedback correction amount SFB (step S208).

Furthermore, when learning of the deviation amount learned value GKlg is executed a predetermined number of times in a state where the learning completion flag is off (the decision outcome of step S209 is positive), the learning completion flag is turned on (step S210). Thereafter, it is determined that there is a record that learning of the deviation amount at the upper limit lift amount VLmax has been completed. When the number of times the deviation amount learned value GKlg is learned is less than the predetermined number of times (the decision outcome of step S209 is negative), the learning completion flag is maintained off (the process of step S210 is skipped), and it is determined that there is no record that learning of the deviation amount at the upper limit lift amount Vlmax has been completed.

When the lift amount VL of the intake valve 30 is equal to the lower limit lift amount VLmin (the decision outcome of step S206 is negative, and the decision outcome of step S211 is positive), the deviation amount learned value GKsm is computed based on the stored deviation amount learned value GKsm, the sub-feedback correction amount SFB, and the coefficient of smoothing N using the following relational expression (step S212).

$$GKsm \leftarrow \{(N-1)GKsm + SFB\}/N$$

Also, in addition to the computation of the deviation amount learned value GKsm, the difference (GKsm(i)−GKsm(i−1)) between the currently computed deviation amount learned value GKsm(i) and the deviation amount learned value GKsm(i−1) that was computed when this process was executed last time is subtracted from the sub-feedback correction amount SFB, and the resultant is set as a new sub-feedback correction amount SFB (step S213).

When the lift amount VL of the intake valve 30 is neither the upper limit lift amount VLmax nor the lower limit lift amount VLmin (the decision outcome of S206 is negative, and the decision outcome of step S211 is negative), the processes of steps S207 to S213 are not executed. That is, the deviation amount learned value GKlg and the deviation amount learned value GKsm are not learned.

When the learning conditions are not met (the decision outcome of step S201 is negative), or when it is not the time for learning (the decision outcome of step S205 is negative), the deviation amount learned value GKlg and the deviation amount learned value GKsm are also not learned.

The process for computing the deviation amount correction value Kvla (step S102 of FIG. 4) is executed as follows based on the deviation amount learned value GKlg and the deviation amount learned value GKsm learned through the above-mentioned learning process.

Figure 11:
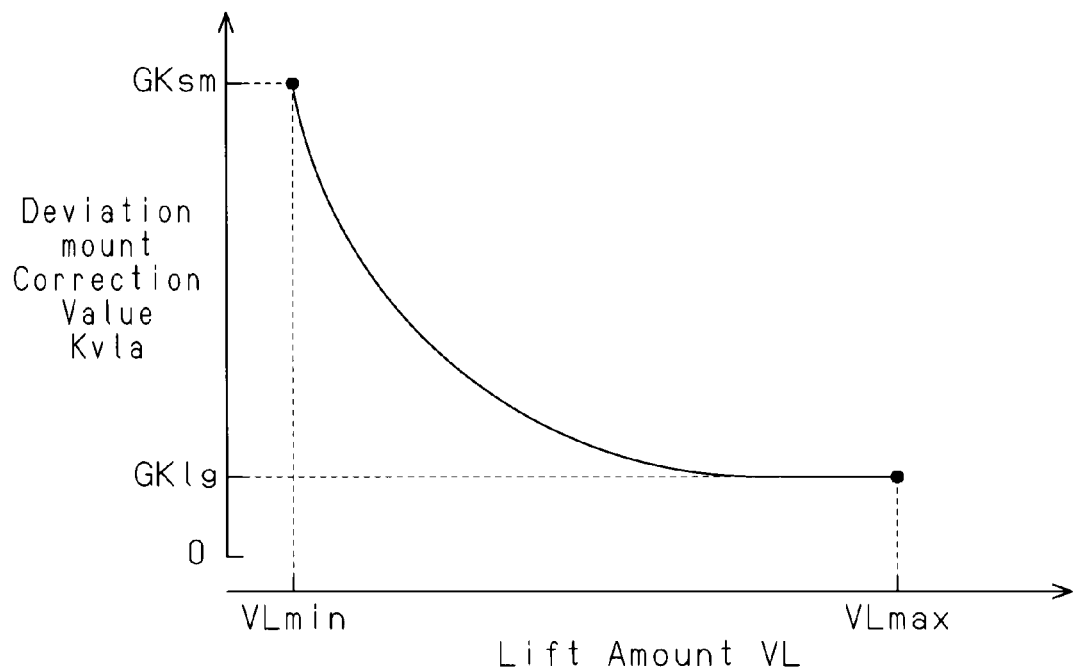
FIG. 11 is a graph showing the relationship between the lift amount of the intake valve and the deviation amount correction value according to the first embodiment.

FIG. 11 shows one example of the relationship among the lift amount VL of the intake valve 30, the deviation amount learned value GKlg, the deviation amount learned value GKsm, and the deviation amount correction value Kvla. As shown in FIG. 11, the deviation amount correction value Kvla is basically increased as the lift amount VL is reduced. More specifically, the deviation amount correction value Kvla is computed as follows.

When the lift amount VL is equal to the lower limit lift amount VLmin (VL=Vmin), the deviation amount learned value GKsm is computed as the deviation amount correction value Kvla.

In the region in which the lift amount VL is less than the upper limit lift amount VLmax and greater than the lower limit lift amount VLmin (VLmin<VL<VLmax), the deviation amount correction value Kvla is computed by interpolating from the deviation amount learned value GKlg and the deviation amount learned value GKsm based on the relationship between the upper limit lift amount VLmax and the lower limit lift amount VLmin with respect to the lift amount VL. More specifically, the value that satisfies the following relational expression is computed as the deviation amount correction value Kvla through a previously set conversion coefficient K1. A positive number less than or equal to 1.0 is set as the conversion coefficient K1 in accordance with the lift amount VL.

$$Kvla = GKlg + \{(GKsm - GKlg) \times K1(VL - VLmax)/(VLmin - VLmax)\}$$

When the lift amount VL is equal to the upper limit lift amount VLmax (VL=VLmax), the deviation amount learned value GKlg is computed as the deviation amount correction value Kvla.

The fuel injection control process according to the first embodiment will now be described.

In the fuel injection control process of the first embodiment, the deviation amount correction value Kvla is a value corresponding to the current lift amount VL of the intake valve 30. More specifically, the smaller the lift amount VL, the greater the deviation amount correction value Kvla becomes. Thus, the deviation amount correction value Kvla is computed in accordance with the tendency that the constant deviation amount between the sub-feedback correction amount SFB and its reference value is increased as the lift amount VL is reduced when the passage area of the communication portion differs from the reference area. The target injection amount Tq is corrected by using the above-mentioned deviation amount correction value Kvla. Therefore, although the lift amount VL of the intake valve 30 is frequently changed through the variable valve lift control, the target injection amount Tq is computed in anticipation of the variation of the air-fuel ratio due to the change in the lift amount VL so as to follow the change in the lift amount VL. Thus, the influence on the air-fuel ratio accompanying the variation of the lift amount VL is suppressed in an appropriate manner, and the air-fuel ratio of the air-fuel mixture is accurately controlled to a desired ratio by adjusting the fuel injection amount through the main feedback control, the sub-feedback control, or the prediction control.

Furthermore, since the sub-feedback correction amount SFB is a value that is increased or decreased by a predetermined amount β in accordance with the output signal from the oxygen sensor 66 at each computation cycle, the fuel injection amount is increased or decreased such that the air-fuel ratio of the air-fuel mixture becomes a desired air-fuel ratio through the correction using the sub-feedback correction amount SFB. Thus, the fuel injection amount is increased or decreased in accordance with the state of the purifying operation of the exhaust gas purifying catalyst 34, and the purifying operation is effectively used.

Since the internal combustion engine 10 of the first embodiment is a multi-cylinder engine, variation of the air-fuel ratio of the air-fuel mixture among the cylinders cannot be avoided due to the individual differences of the fuel injection valves 20 and deposit collected on the intake valves 30. Also in the first embodiment, the manner in which the exhaust gas abuts against the air-fuel ratio sensor 64 differs among the cylinders since the air-fuel ratio sensor 64 for detecting the air-fuel ratio of the air-fuel mixture of the cylinders is shared among all the cylinders.

Figure 12:
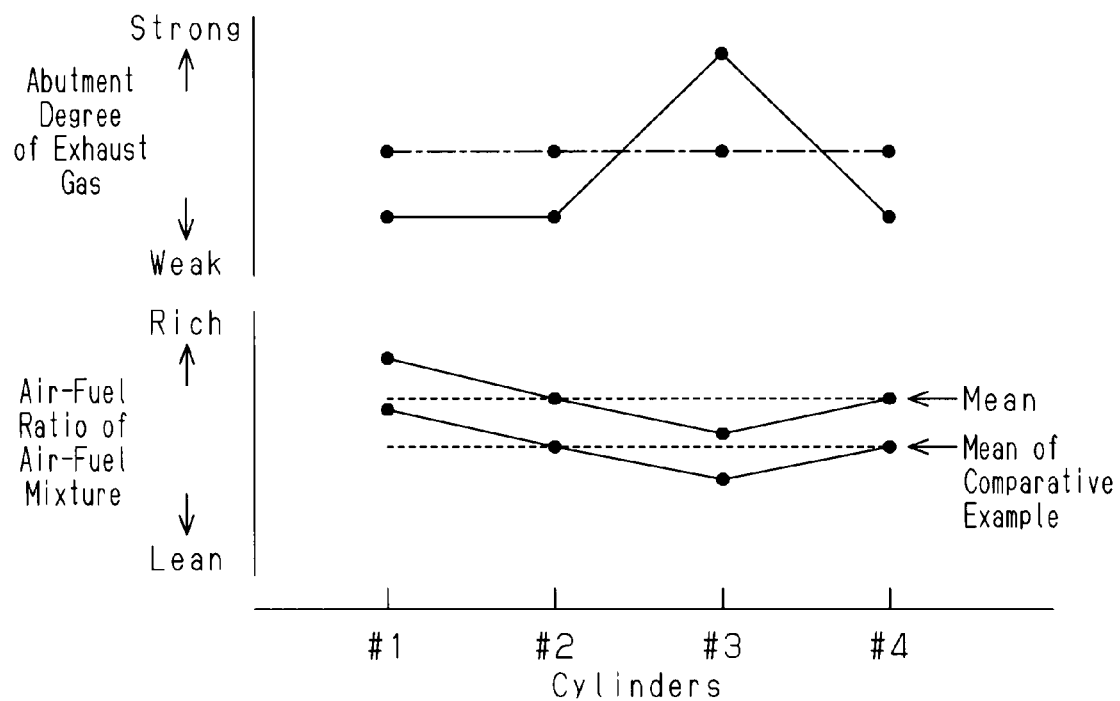
FIG. 12 is a diagram showing the abutment degree of the exhaust gas against the air-fuel ratio sensor and the exhaust gas property for each cylinder.

Therefore, if the target injection amount Tq is increased or decreased based on the output signal of the air-fuel ratio sensor 64, the variation in the air-fuel ratio among the cylinders reduces the adjusting accuracy when adjusting the property of the exhaust gas upstream of the exhaust gas purifying catalyst 34 to become the property corresponding to an air-fuel ratio in the vicinity of the stoichiometric air-fuel ratio. More specifically, the solid line in FIG. 12 shows an example of the internal combustion engine in which the exhaust gas in a specific cylinder (the third cylinder #3 in the example shown in FIG. 12) easily abuts against the air-fuel ratio sensor 64 as compared to exhaust gas of other cylinders (the first cylinder #1, the second cylinder #2, and the fourth cylinder #4). As shown in FIG. 12, when the exhaust gas of the specific cylinder (the third cylinder #3) has the property corresponding to the lean air-fuel ratio, the target injection amount Tq is excessively increased, and the mean of the air-fuel ratio of the air-fuel mixture undesirably becomes rich. Also, the alternate long and short dash line in FIG. 12 shows the air-fuel ratio of the air-fuel mixture and the abutment degree of the exhaust gas in each of the cylinders when the exhaust gases in the cylinders abut against the air-fuel ratio sensor 64 in the same manner, as a comparative example.

Thus, with the device according to the first embodiment, the difference between the output value of the oxygen sensor 66 provided downstream of the exhaust gas purifying catalyst 34 and its reference value (the value corresponding to the oxygen concentration in the exhaust gas when the air-fuel ratio of the air-fuel mixture equals the stoichiometric air-fuel ratio) is likely to be increased, and consequently, the variation in the air-fuel ratio accompanying the change in the lift amount VL is likely to be increased. According to the first embodiment, the air-fuel ratio of the air-fuel mixture is accurately controlled to a desired ratio in the device applied to such a multi-cylinder internal combustion engine 10.

In the fuel injection control, as the function defined by the lift amount VL of the intake valve 30, the deviation amount learned value GKlg, the deviation amount learned value GKsm, the deviation amount correction value Kvla, and the conversion coefficient K1, a linear function in which the deviation amount correction value Kvla is increased as the lift amount VL is reduced is previously set (see FIG. 11). The relationship between the lift amount of the intake valve 30 and the deviation amount is learned to change the inclination of the function in accordance with the constant deviation amount when the lift amount VL equals the lower limit lift amount VLmin or the upper limit lift amount VLmax. Therefore, the above-mentioned relationship is learned in a wide lift amount region with low learning frequency as compared to the configuration in which finely divided lift amount regions are set, and the deviation amount is computed and set as the deviation amount learned value for each region.

In the first embodiment, the main feedback control and the sub-feedback control are not executed during cold operation of the internal combustion engine 10 (when the engine is not sufficiently warmed). Instead, a value obtained by correcting the basic injection amount Qbse by the deviation amount correction value Kvla is computed as the target injection amount Tq, and the prediction control based on the target injection amount Tq is executed. Even if the basic injection amount Qbse deviates from the fuel injection amount that is appropriate for the passage area, the correction of the basic injection amount Qbse by the deviation amount correction value Kvla as described above inhibits the occurrence of the disadvantage in which the actual air-fuel ratio deviates from the target air-fuel ratio causing the exhaust gas property to become constantly poor during the execution of the prediction control.

However, if the deviation amount learned values GKlg, GKsm are initialized by, for example, changing batteries, the relationship learned as described above may be unnecessarily reset. Afterwards, when the internal combustion engine 10 is started, the above-mentioned disadvantage cannot be eliminated for a long period of time from when the execution of the main feedback control and the sub-feedback control are started until the relationship is learned and an appropriate relationship is achieved.

Thus, in the first embodiment, when there is no record of completing learning of the deviation amount at the lift amount (the upper limit lift amount VLmax) used during the execution of the prediction control, the lift amount VL of the intake valve 30 is inhibited from being shifted from the upper limit lift amount VLmax to other lift amounts.

Figure 13:
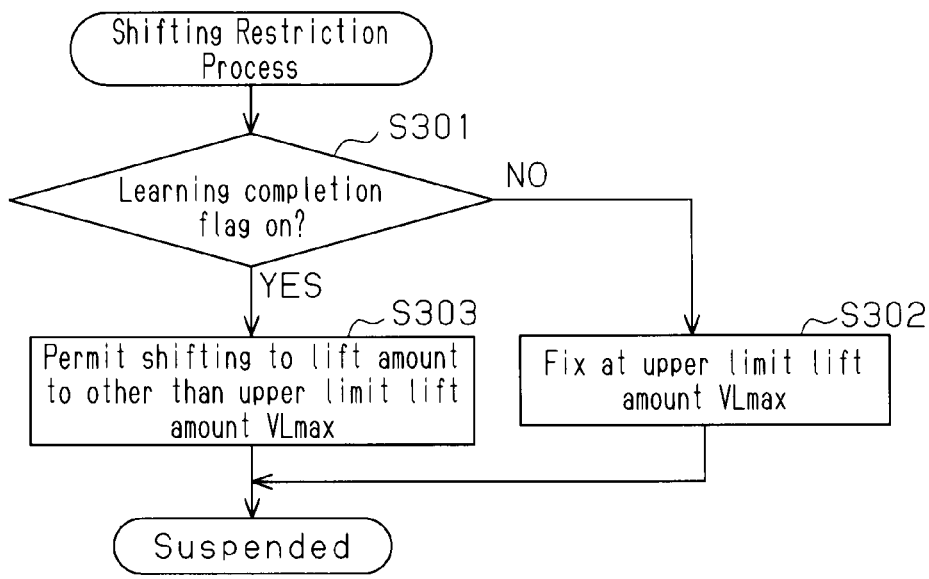
FIG. 13 is a flowchart showing a shifting restriction process according to the first embodiment.

FIG. 13 is a flowchart showing a process for restricting such shifting of the lift amount VL (shifting restriction process). The routine shown in FIG. 13 is executed by the electronic control unit 50 at a predetermined cycle included in the routine of the variable valve lift control. In the first embodiment, the shifting restriction process corresponds to the process executed by an inhibiting section.

In this process, when the learning completion flag is off (the decision outcome of step S301 is negative), the lift amount VL of the intake valve 30 is fixed at the upper limit lift amount VLmax (step S302) as shown in FIG. 13. When the routine is repeated thereafter, and the learning completion flag is turned on (the decision outcome of step S301 is positive), shifting of the lift amount VL of the intake valve 30 to a lift amount other than the upper limit lift amount VLmax is permitted (step S303).

The shifting restriction process will be described below.

Figure 14:
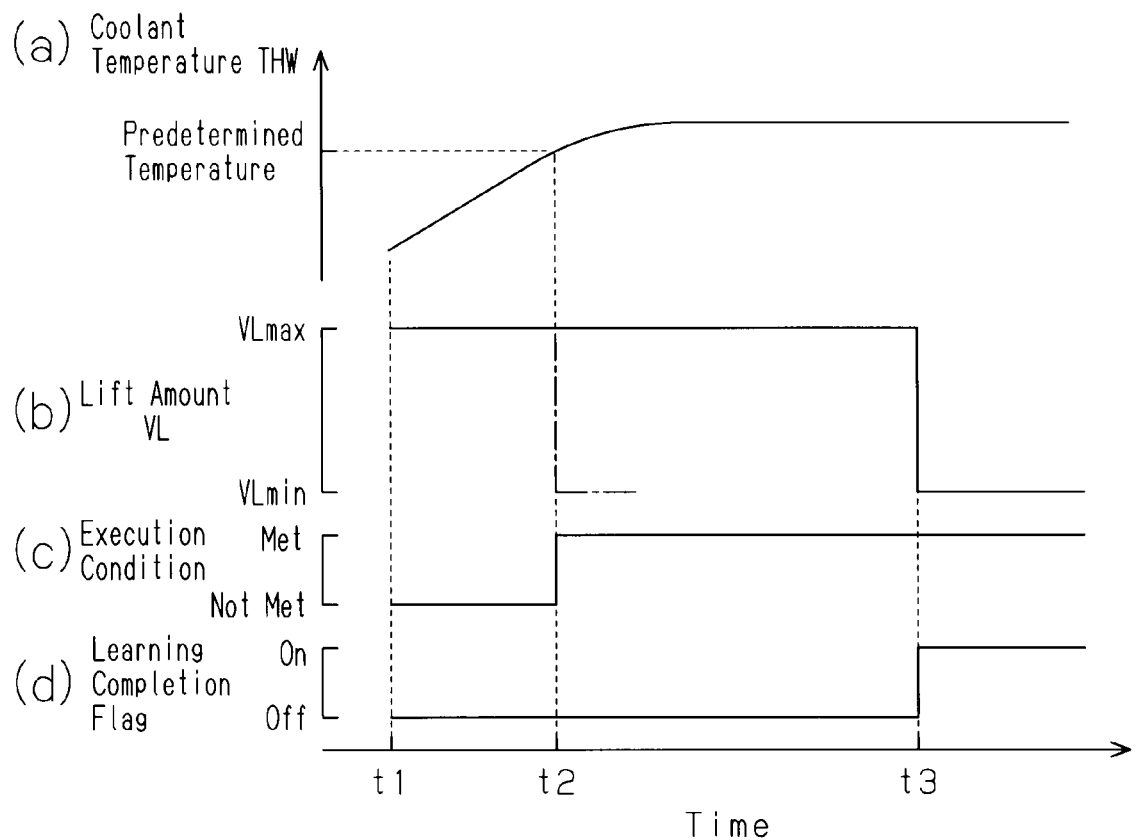
FIG. 14 is a timing chart showing one example of the shifting restriction process.

FIG. 14 shows one example of an execution manner of the shifting restriction process when the internal combustion engine 10 is cold started in a state where the learned relationship has been unnecessarily reset by, for example, changing batteries.

As shown in FIG. 14, when the internal combustion engine 10 is started at time t1, the lift amount VL of the intake valve 30 (FIG. 14(*b*)) is set to the upper limit lift amount VLmax since the coolant temperature THW (FIG. 14(*a*)) is low at this time.

Then, at time t2, the coolant temperature THW becomes greater than or equal to the predetermined temperature so that the execution condition of the main feedback control and the sub-feedback control (FIG. 14(*c*)) is met, and thus, the execution of the main feedback control and the sub-feedback control is started. Since the learning completion flag (FIG. 14(*c*)) is off at this time, it is determined that learning of the deviation amount at the upper limit lift amount VLmax has not been completed. Thus, shifting of the lift amount to a lift amount other than the upper limit lift amount VLmax is inhibited, and the lift amount VL of the intake valve 30 is maintained at the upper limit lift amount VLmax.

In the device of the comparative example in which the shifting restriction process is not executed (shown by a alternate long and short dash line in FIG. 14), when the coolant temperature THW becomes greater than or equal to the predetermined temperature so that the execution condition of the main feedback control and the sub-feedback control is met, the lift amount VL is changed to a lift amount (the lower limit lift amount VLmin in this example) corresponding to the operating condition of the internal combustion engine 10. In the device of the comparative example, a long period of time is required to complete the learning since learning of the deviation amount (more specifically, the deviation amount learned value GKlg) at the upper limit lift amount VLmax is executed only at limited opportunities when the lift amount VL becomes equal to the upper limit lift amount VLmax such as during high load operation of the internal combustion engine 10.

In contrast, the lift amount VL of the intake valve 30 is fixed at the upper limit lift amount VLmax in such cases in the device of the first embodiment. Thus, learning of the deviation amount (more specifically, the deviation amount learned value GKlg) at the upper limit lift amount VLmax is executed at the highest priority.

Then, at time t3, when learning of the deviation amount learned value GKlg is completed, and the learning completion flag is turned on, the lift amount VL of the intake valve 30 is changed to a lift amount (the lower limit lift amount VLmin in this example) corresponding to the operating condition of the internal combustion engine 10.

In the first embodiment as described above, when the learned relationship is unnecessarily reset, learning of the deviation amount at the upper limit lift amount VLmax is executed and completed at the highest priority during the immediately following engine operation. This eliminates the disadvantage caused by stopping the engine operation before learning of the deviation amount is completed. In the first embodiment, when the number of times learning of the deviation amount learned value GKlg is executed is less than a predetermined number of times, it is determined that there is no record of completing learning of the deviation amount at the upper limit lift amount VLmax. Thus, it is determined that there is no record during a period in which learning of the deviation amount is repeated until the gradually changing deviation amount learned value GKlg is equal to the deviation amount. That is, when the internal combustion engine 10 is stopped, it is determined that there is no record during a period in which the exhaust gas property might become constantly poor while the prediction control is executed in the next engine operation.

Also, in the learning process of the first embodiment, when the learning completion flag is off, the changing speed of the deviation amount learned value GKlg at the upper limit lift amount VLmax is set higher than when the flag is on. Thus, learning of the deviation amount at the upper limit lift amount VLmax is completed at an earlier stage, thereby inhibiting the occurrence of the disadvantage in an appropriate manner.

If the changing speed of the deviation amount learned value GKlg is simply increased, the convergence of the deviation amount learned value GKlg to the deviation amount deteriorates. This can make the deviation amount learned value GKlg, and consequently, the target injection amount Tq, to be unstable.

In this regard, in the first embodiment, when the difference ΔSFB between the sub-feedback correction amount SFB and the reference value is great, in other words, when the difference between the deviation amount and the deviation amount learned value GKlg is great, the deviation amount learned value GKlg is changed relatively quickly to approach the deviation amount, and learning of the deviation amount is completed at an early stage. Furthermore, when the difference ΔSFB is small, in other words, when the difference between the deviation amount and the deviation amount learned value GKlg is small, the changing speed of the deviation amount learned value GKlg is lessened so as to increase the convergence of the deviation amount learned value GKlg to the deviation amount, thereby inhibiting the target injection amount Tq from becoming unstable.

Also, as the exhaust gas purifying catalyst 34 deteriorates, the amount of oxygen that can be stored is reduced as described above. Therefore, when the deterioration degree of the exhaust gas purifying catalyst 34 is small, the point in time at which the change of the oxygen concentration in the exhaust gas that flows into the exhaust gas purifying catalyst 34 appears in the change of the output signal of the oxygen sensor 66 tends to delay, and the changing range of the sub-feedback correction amount SFB tends to increase. Thus, when the changing speed of the deviation amount learned value GKlg is set high when the deterioration degree of the exhaust gas purifying catalyst 34 is small, the deviation amount learned value GKlg is not easily stabilized.

In this respect, since the smaller the deterioration degree of the exhaust gas purifying catalyst 34 is, the lower the changing speed of the deviation amount learned value GKlg is set in the first embodiment, the deviation amount can be learned while stabilizing the deviation amount learned value GKlg.

The first embodiment has the following advantages.

(1) While suppressing the influence on the air-fuel ratio of the difference in the operating manner of the variable valve lift mechanism 42 through the correction using the deviation amount correction value Kvla, the air-fuel ratio of the air-fuel mixture is adjusted to a desired air-fuel ratio by adjusting the fuel injection amount through the main feedback control, the sub-feedback control, or the prediction control. Furthermore, when there is no record of completing learning of the deviation amount at the upper limit lift amount VLmax, the occurrence of the disadvantage is prevented in which the operation of the engine is stopped before completing the learning and the exhaust gas property becomes constantly poor during the execution of the prediction control in the next operation. Therefore, the air-fuel ratio of the air-fuel mixture is controlled to the desired air-fuel ratio accurately in the internal combustion engine 10 provided with the variable valve lift mechanism 42.

(2) When the number of times the deviation amount learned value GKlg is learned is less than the predetermined number of times, the learning completion flag is maintained off, and it is determined that there is no record of completing learning of the deviation amount at the upper limit lift amount VLmax. Thus, it is determined that there is no record during a period in which learning of the deviation amount learned value GKlg is repeated until the gradually changing deviation amount learned value GKlg is equal to the deviation amount. That is, when the internal combustion engine 10 is stopped, it is determined that there is no record during a period in which the exhaust gas property might become constantly poor while the prediction control is executed in the next operation.

(3) When there is no record, the changing speed of the deviation amount learned value GKlg is set higher than when there is the record. Thus, when there is no record, learning of the deviation amount at the upper limit lift amount VLmax is completed at an early stage by quickly changing the deviation amount learned value GKlg, thereby eliminating the disadvantage from occurring in a suitable manner.

(4) The changing speed of the deviation amount learned value GKlg when there is no record is set higher as the difference ΔSFB between the sub-feedback correction amount SFB and the reference value is increased. Thus, when the difference ΔSFB is great, in other words, when the difference between the deviation amount and the deviation amount learned value GKlg is great, the deviation amount learned value GKlg is changed relatively quickly to approach the deviation amount, and learning of the deviation amount is completed at an early stage. Furthermore, when the difference ΔSFB is small, in other words, when the difference between the deviation amount and the deviation amount learned value GKlg is small, the convergence of the deviation amount learned value GKlg to the deviation amount is increased by lessening the changing speed of the deviation amount learned value GKlg, thereby inhibiting the target injection amount Tq from becoming unstable.

(5) The changing speed of the deviation amount learned value GKlg when there is no record is set higher as the deterioration degree is increased. Therefore, the deviation amount at the upper limit lift amount VLmax is learned while stabilizing the deviation amount learned value GKlg.

(6) The deviation amount learned value GKlg corresponding to the upper limit lift amount VLmax and the deviation amount learned value GKsm corresponding to the lower limit lift amount VLmin are separately learned and stored. Based on the relationship of the upper limit lift amount VLmax and the lower limit lift amount VLmin with the lift amount VL, the deviation amount correction value Kvla is computed by interpolating from the deviation amount learned values GKlg, GKsm. Thus, as compared to a device in which finely divided lift amount regions are set and the deviation amount is calculated for each region to be set as the learned value, the relationship between the constant deviation amount and the lift amount VL of the intake valve 30 is learned less frequently and for a wider lift amount region.

A second embodiment of the present invention will now be described. The differences from the first embodiment will mainly be described.

The air-fuel ratio control device according to the second embodiment differs from the air-fuel ratio control device according to the first embodiment in the computing manner and the processing manner of the learning process of the deviation amount correction value.

In the second embodiment, learning regions (a first region (VL>VL1), a second region (VL1≧VL>VL2), a third region (VL2≧VL>VL3), and a fourth region (VL3≧VL)) are specified for the lift amount of the intake valve 30, and learned values GK (GK1, GK2, GK3, and GK4) are set for each of the learning regions as shown in FIG. 15. In the second embodiment, the first region including the upper limit lift amount VLmax corresponds to the first specific lift amount, and other second to fourth regions correspond to the second specific lift amount.

In the fuel injection control process according to the second embodiment, the process for computing the deviation amount correction value Kvlb (the process corresponding to step S102 of FIG. 4) selects one of the learning regions (first to fourth regions) based on the lift amount VL, and computes the deviation amount learned value GK corresponding to the selected learning region as the deviation amount correction value Kvlb.

Also, the process for computing the target injection amount Tq (the process corresponding to step S104 of FIG. 4, and the process corresponding to steps S110, S115 of FIG. 5) is executed based on the deviation amount correction value Kvlb.

In the fuel injection control process according to the second embodiment, the same processes as those executed in the fuel injection control process of the first embodiment are executed as the processes other than a process for computing the deviation amount correction value Kvlb and a process for computing the target injection amount Tq.

The learning process according to the second embodiment is executed as follows.

Figure 16:
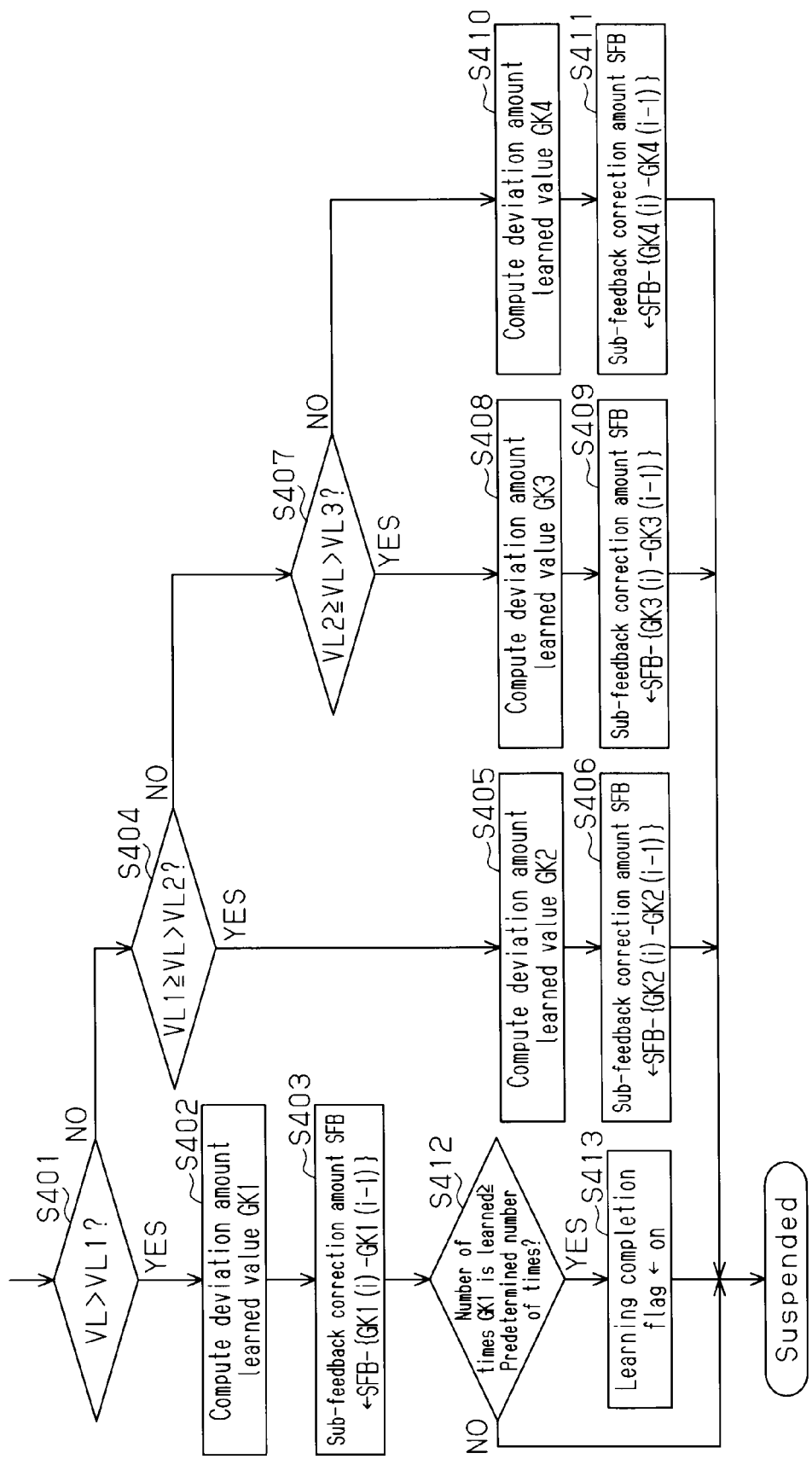
FIG. 16 is a flowchart showing a learning process according to the second embodiment.

FIG. 16 is a flowchart showing the learning process, and the routine shown in the flowchart is executed by the electronic control unit 50 at a predetermined cycle. In the second embodiment, the learning process corresponds to the process executed by the learning section.

In this process, first, if the learning conditions are met (the decision outcome of step S201 of FIG. 8 is positive), the execution cycle A and the coefficient of smoothing N are set in accordance with the manipulation state of the learning completion flag (steps S202 to 204) as shown in FIG. 16. Thereafter, if it is the time for learning in each execution cycle A (the decision outcome of step S205 is positive), the process for learning the deviation amount (steps S401 to S411 of FIG. 16) is executed.

That is, first, the learning region is selected in accordance with the lift amount VL of the intake valve 30 (steps S401, S404, S407). Then, the deviation amount learned value GK is computed based on the deviation amount learned value GK that is stored as a value corresponding to the selected learning region, the sub-feedback correction amount SFB, and the coefficient of smoothing N using the following relational expression (steps S402, S405, S408, S410).

$$GK \leftarrow \{(N-1)GK+SFB\}/N$$

Also, in addition to the computation of the deviation amount learned value GK, a value obtained by subtracting the difference {GK(i)−GK(i−1)} between the currently computed deviation amount learned value GK(i) and the deviation amount learned value GK(i−1) stored as a value corresponding to the previous learning region from the sub-feedback correction amount SFB is set as a new sub-feedback correction amount SFB (steps S403, S406, S409, S411).

When the lift amount VL of the intake valve 30 is greater than the predetermined amount VL1 (the decision outcome of step S401 is positive), that is, when the first learning region is selected as the learning region, a process for setting the learning completion flag is executed after the process for computing the deviation amount learned value GK1 (step S402) and the process for setting the sub-feedback correction amount SFB (step S403) are executed. More specifically, when the learning of the deviation amount learned value GK1 is executed for the predetermined number of times in a state where the learning completion flag is off (the decision outcome of step S412 is positive), the learning completion flag is turned on (step S413). When the number of times the deviation amount learned value GK1 is learned is less than the predetermined number of times (the decision outcome of step S412 is negative), the learning completion flag is maintained off. After this process, the routine is temporarily suspended.

When the lift amount VL of the intake valve 30 is less than or equal to the predetermined amount VL1 (the decision outcome of step S401 of FIG. 16 is negative), the process for computing the deviation amount learned value GK (steps S405, S408, S411) and the process for setting the sub-feedback correction amount SFB (steps S406, S409, S412) are executed. After that, the routine is temporarily suspended.

The fuel injection control process according to the second embodiment including the learning process will now be described.

In the fuel injection control of the second embodiment, the relationship between the constant deviation amount of the sub-feedback correction amount SFB from its reference value and the lift amount VL of the intake valve 30 is learned. From the learned relationship, the deviation amount correction value Kvlb is computed based on the lift amount VL. More specifically, the first to fourth learning regions are set for the lift amount VL of the intake valve 30, and the deviation amount learned values GK (GK1 to GK4) are learned and stored for each region. Then, one of the first to fourth regions is selected based on the lift amount VL, and the deviation amount learned value GK corresponding to the selected learning region is computed as the deviation amount correction value Kvlb.

Thus, when the passage area of the communication portion differs from its reference area, a value computed as the deviation amount correction value Kvlb corresponds to the tendency that the smaller the lift amount VL is, the greater the constant deviation amount between the sub-feedback correction amount SFB and the reference value becomes. More specifically, the deviation amount correction value Kvlb is increased as the lift amount VL is reduced. Then, the target injection amount Tq is corrected by using the deviation amount correction value Kvlb.

Therefore, although the lift amount VL of the intake valve 30 is frequently changed through the variable valve lift control, the target injection amount Tq is computed in anticipation of the variation of the air-fuel ratio due to the change in the lift amount VL. Thus, the influence on the air-fuel ratio accompanying the variation of the lift amount VL is suppressed in an appropriate manner, and the air-fuel ratio of the air-fuel mixture is accurately controlled to a desired ratio by adjusting the fuel injection amount through the main feedback control, the sub-feedback control, or the prediction control.

Next, the operations achieved by executing the shifting restriction process (see FIG. 13) will be described.

When the internal combustion engine 10 is cold started in a state where the relationship learned as described above is unnecessarily reset due to the initialization of the deviation amount learned value GK caused by, for example, changing batteries, the lift amount VL of the intake valve 30 is set to the upper limit lift amount VLmax since the coolant temperature THW is low at this time.

Thereafter, when the coolant temperature THW becomes greater than or equal to the predetermined temperature so that the execution condition is met, the execution of the main feedback control and the sub-feedback control is started. Since the learning completion flag is off at this time, it is determined that learning of the deviation amount for the learning region including the upper limit lift amount VLmax (the first learning region) has not been completed. Thus, shifting of the lift amount to other than the upper limit lift amount VLmax is inhibited, and the lift amount VL of the intake valve 30 is maintained at the upper limit lift amount VLmax. Accordingly, unlike the device of the comparative example described above, the lift amount VL of the intake valve 30 is not changed to a lift amount corresponding to the engine operating condition, and is fixed at the upper limit lift amount VLmax. Thus, learning of the deviation amount (more specifically, the deviation amount learned value GK1) at the first learning region is executed at the highest priority.

When learning of the deviation amount in the first learning region is completed, and the learning completion flag is turned on, the lift amount VL of the intake valve 30 is changed to a lift amount corresponding to the operating condition of the internal combustion engine 10.

In the second embodiment as described above, when the learned relationship is unnecessarily reset, learning of the deviation amount in the first learning region is executed and completed at the highest priority during the immediately following operation of the engine. This inhibits the occurrence of the disadvantage in which the operation of the engine is stopped before completing the learning and the exhaust gas property becomes constantly poor during the execution of the prediction control in the next engine operation.

The second embodiment has the advantages equivalent to the advantages (1) to (5), more specifically, the following advantages (7) to (11).

(7) While suppressing the influence on the air-fuel ratio due to the difference in the operating manner of the variable valve lift mechanism 42 through correction by the deviation amount correction value Kvlb, the air-fuel ratio of the air-fuel mixture is adjusted to a desired ratio by adjusting the fuel injection amount through the main feedback control, the sub-feedback control, or the prediction control. Furthermore, when there is no record of completing learning of the deviation amount in the first learning region, the occurrence of the disadvantage is eliminated in which operation of the engine is stopped before the learning is completed and the exhaust gas property becomes constantly poor during the execution of the prediction control in the next operation. Therefore, the air-fuel ratio of the air-fuel mixture is accurately controlled to the desired ratio in the internal combustion engine 10 provided with the variable valve lift mechanism 42.

(8) When the number of times the deviation amount learned value GK1 is learned is less than the predetermined number of times, the learning completion flag is maintained off, and it is determined that there is no record of completing the learning of the deviation amount in the first learning region. Thus, it is determined that there is no record during a period in which learning of the deviation amount is repeated until the gradually changing deviation amount learned value GK1 is equal to the deviation amount, that is, during a period in which when the internal combustion engine 10 is stopped, the exhaust gas property might become constantly poor during the execution of the prediction control in the next operation.

(9) When there is no record, the changing speed of the deviation amount learned value GK1 in the first learning region is set higher than the case when there is the record. Thus, when there is no record, learning of the deviation amount in the first learning region is completed at an early stage by promptly changing the deviation amount learned value GK1, and the occurrence of the disadvantage is prevented in a suitable manner.

(10) The changing speed of the deviation amount learned value GK1 when there is no record is set higher as the difference ΔSFB between the sub-feedback correction amount SFB and its reference value is increased. Thus, when the difference ΔSFB is increased, in other words, when the difference between the deviation amount and the deviation amount learned value GK1 is increased, the deviation amount learned value GK1 is relatively quickly changed to approach the deviation amount, and learning of the deviation amount is completed at an early stage. Furthermore, when the difference ΔSFB is reduced, in other words, when the difference between the deviation amount and the deviation amount learned value GK1 is reduced, the changing speed of the deviation amount learned value GK1 is lessened so as to increase the convergence of the deviation amount learned value GK1 to the deviation amount, and the target injection amount Tq is inhibited from being unstable.

(11) The changing speed of the deviation amount learned value GK1 when there is no record is set higher as the deterioration degree of the exhaust gas purifying catalyst 34 is increased. Thus, the deviation amount in the first learning region is learned while stabilizing the deviation amount learned value GK1.

The above embodiments may be modified as follows.

In the first embodiment, the deviation amount correction value may be computed as mentioned in the following items (A) and (B).

Figure 17:
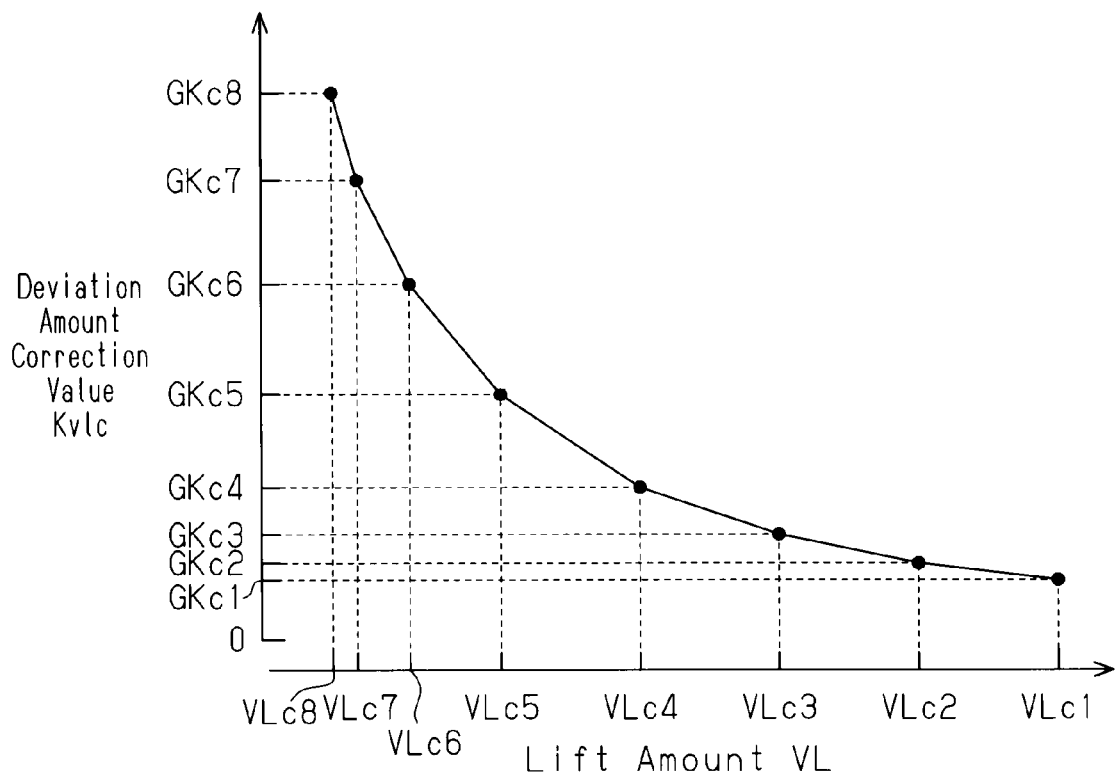
FIG. 17 is a graph showing the relationship between the lift amount of the intake valve and the deviation amount correction value according to a modified embodiment of the present invention.

(A) FIG. 17 shows one example of the relationship between the lift amount VL of the intake valve 30 and the deviation amount correction value Kvlc. As shown in FIG. 17, first, the deviation amount when the lift amount VL of the intake valve 30 is equal to each of specific lift amounts (VLc1 (=VLmax), VLc2, VLc3, ..., VLcn (=VLmin)) is learned as a deviation amount learned value GKc (GKc1, GKc2, GKc3, ..., GKcn). FIG. 17 shows an example in which eight specific lift amounts VLc1 to VLc8 are set. When the lift amount VL is equal to one of the specific lift amounts, the deviation amount learned value GKc corresponding to the specific lift amount is computed as the deviation amount correction value Kvlc. When the lift amount VL is equal to none of the specific lift amounts, the deviation amount correction value Kvlc is computed, based on the relationship between the current lift amount VL and the specific lift amounts sandwiching the lift amount VL, by linearly interpolating from both deviation amount learned values corresponding to those specific lift amounts.

Figure 18:
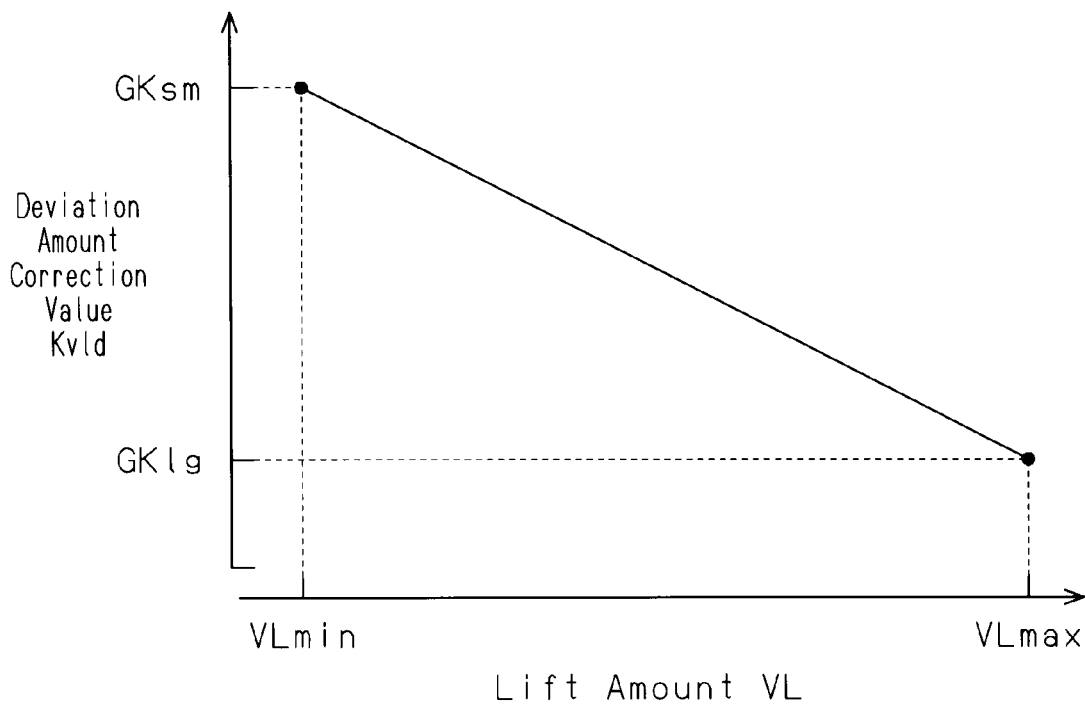
FIG. 18 is a graph showing the relationship between the lift amount of the intake valve and the deviation amount correction value according to a modified embodiment of the present invention.

(B) FIG. 18 shows one example of the relationship between the lift amount VL of the intake valve 30 and the deviation amount correction value Kvld. As shown in FIG. 18, first, when the lift amount VL is equal to the upper limit lift amount VLmax, the deviation amount learned value GKlg is computed as the deviation amount correction value Kvld. When the lift amount VL is equal to the lower limit lift amount VLmin, the deviation amount learned value GKsm is computed as the deviation amount correction value Kvld. When the lift amount VL is neither the upper limit lift amount VLmax nor the lower limit lift amount VLmin, the deviation amount correction value Kvld is computed, based on the relationship between the current lift amount VL with respect to the upper limit lift amount VLmax and the lower limit lift amount VLmin, by linearly interpolating from the deviation amount learned values GKlg, GKsm.

The first embodiment may be applied after modifying the configuration as required to a device in which lift amounts (the specific lift amounts) other than the upper limit lift amount VLmax and the lower limit lift amount VLmin are used during the execution of the prediction control, and in which the specific lift amounts are less frequently set during the execution of the main feedback control and the sub-feedback control. With this configuration, in addition to learning the deviation amount at the specific lift amounts, when there is no record of completing the learning, the lift amount may be inhibited from being changed to a lift amount other than the specific lift amount, or the changing speed of the deviation amount learned value corresponding to the specific lift amount may be increased. When the lift amount VL is in a region greater than the specific lift amount, the deviation correction value may be computed using an extrapolation method in place of interpolation.

In the first embodiment, instead of learning the deviation amount corresponding to the lower limit lift amount VLmin, for example, the deviation amount corresponding to a lift amount (specific lift amount) other than the lower limit lift amount VLmin such as a lift amount slightly greater than the lower limit lift amount VLmin may be learned. With this configuration, the deviation amount correction value may be computed using an extrapolation method in place of interpolation in a region where the lift amount VL is smaller than the specific lift amount.

In the first embodiment, the deviation amount correction value is computed by interpolating from the deviation amount learned values GKlg, GKsm based on the relationship of the upper limit lift amount VLmax and the lower limit lift amount VLmin with the lift amount VL. Instead, a map that specifies the relationship between the lift amount VL and the deviation amount correction value may be previously set, and the deviation amount correction value may be computed based on the lift amount VL using the map. In this case, the relationship stored in the map is corrected in accordance with the deviation amount learned values GKlg, GKsm, so that the relationship between the constant deviation amount and the lift amount VL is learned.

In the second embodiment, five or more regions may be set as the learning regions. Also, only three regions, or only two regions may be set as the learning region.

The second embodiment may be applied after modifying the configuration as required to a device in which lift amounts (the specific lift amounts) other than the upper limit lift amount VLmax and the lower limit lift amount VLmin are used during the execution of the prediction control, and in which the specific lift amounts are less frequently set during the execution of the main feedback control and the sub-feedback control. When there is no record of completing learning of the deviation amount at the first lift amount region (the specific learning region) including the specific lift amount, the lift amount may be inhibited from being changed to a lift amount other than the specific lift amount, or the changing speed of the deviation amount learned value corresponding to the specific learning region may be increased.

In each of the embodiments, the shifting restriction process may be omitted. In this configuration, the changing speed of the deviation amount learned value GKsm (the first embodiment) at the lower limit lift amount VLmin, and the changing speed of the deviation amount learned value GK1 (the second embodiment) in the lift amount region other than the first lift amount region (the first learning region) are desirably not changed regardless of whether there is the record. Thus, in a region in which the influence on the air-fuel ratio caused by the difference between the deviation amount learned value stored in the electronic control unit 50 and a value corresponding to the actual condition is lessened since the main feedback control and the sub-feedback control are executed, the changing speed of the deviation amount learned value is not changed, and the learning is executed in a suitable manner with the changing speed appropriate for learning the deviation amount.

In each of the embodiments, the execution cycle A and the coefficient of smoothing N may be set based on only one of the difference ΔSFB and the deterioration degree of the exhaust gas purifying catalyst 34 when the learning completion flag is off.

In each of the embodiments, fixed values may be set as the execution cycle A and the coefficient of smoothing N when the learning completion flag is off. In this case, a cycle shorter than the predetermined cycle A1 may be set as the execution cycle A, and a value smaller than the predetermined value N1 may be set as the coefficient of smoothing N.

In each of the embodiments, the process for setting the execution cycle A and the coefficient of smoothing N in accordance with the manipulation state of the learning completion flag (steps S202 to S204 of FIG. 8) may be omitted, and fixed values may be previously set as the execution cycle A and the coefficient of smoothing N. With this configuration, the changing speed of the deviation amount learned value GKlg (the first embodiment), or the changing speed of the deviation amount learned value GK1 (the second embodiment) is set to a certain speed regardless of whether there is the record.

In each of the embodiments, it may be determined that learning of the deviation amount has been completed when the deviation between the output voltage of the oxygen sensor 66 and the reference voltage has been small for a predetermined time period, or when the number of times in which the output voltage of the oxygen sensor 66 is changed over the reference voltage is equal to a predetermined number of times or more.

In each of the embodiments, it may be determined that the internal combustion engine 10 has been warmed when the temperature other than the coolant temperature THW, for example, the temperature that serves as an index of the temperature of the internal combustion engine 10 such as the temperature of lubricating oil is greater than or equal to a predetermined temperature. Also, it may be determined that the engine has been warmed when the directly detected temperature of the internal combustion engine 10 is greater than or equal to a predetermined temperature.

Each of the embodiments may be applied to a device that learns the relationship between the constant deviation amount of the main feedback correction amount MFB from its reference value and the lift amount VL of the intake valve 30 after modifying the configuration as required. In this case, the process of the sub-feedback control and the oxygen sensor 66 may be omitted.

The present invention may be applied to an internal combustion engine including one to three cylinders or an internal combustion engine including five or more cylinders.

The invention claimed is:

1. An air-fuel ratio control device of an internal combustion engine, the engine including a variable valve lift mechanism, which changes the lift amount of an intake valve, and a sensor that outputs a signal corresponding to the oxygen concentration in exhaust gas, wherein, when an execution condition is not met after operation of the engine has been started, the control device sets a fuel injection amount command value through prediction control based on the operating condition of the engine, and when the execution condition is met, the control device sets the fuel injection amount command value through feedback control using a correction amount computed based on the output value of the sensor, the control device comprising:
a learning section, wherein, when the execution condition is met, the learning section learns, as a deviation amount learned value, a constant deviation amount between the correction amount and its reference value in different manners between a case in which the lift amount is in a first lift amount region used only when the execution condition is not met and a case in which the lift amount is in a second lift amount region used only when the execution condition is met, the learning section computes and stores the relationship between the deviation amount and the lift amount based on the deviation amount learned value;
a correction section that computes a deviation amount correction value from the stored relationship and based on the lift amount, and corrects the fuel injection amount command value using the deviation amount correction value; and
an inhibiting section, wherein, when there is no record of completing learning of the deviation amount when the lift amount is in the first lift amount region, the inhibiting section inhibits the lift amount from being shifted from the first lift amount region to other lift amount region.

2. The control device according to claim 1, wherein the internal combustion engine includes an exhaust passage, which discharges the exhaust gas from the engine, the exhaust passage being provided with an exhaust gas purifying catalyst, and
wherein the sensor is located in the exhaust passage downstream of the exhaust gas purifying catalyst in the flowing direction of the exhaust gas.

3. The control device according to claim 1, wherein the learning section learns, as the deviation amount learned value, a value obtained by gradually changing the deviation amount at a predetermined interval, and
wherein the inhibiting section determines that there is no record when the number of times the deviation amount learned value is learned is less than a predetermined number of times.

4. The control device according to claim 1, wherein the learning section learns a value obtained by gradually changing the deviation amount as the deviation amount learned value, and
the control device further comprising a setting section, wherein, when there is not the record, the setting section sets the changing speed of the deviation amount learned value when the lift amount is in the first lift amount region higher than when there is the record.

5. An air-fuel ratio control device of an internal combustion engine, the engine including a variable valve lift mechanism, which changes the lift amount of an intake valve, and a sensor that outputs a signal corresponding to the oxygen concentration in exhaust gas, wherein, when an execution condition is not met after operation of the engine has been started, the control device sets a fuel injection amount command value through a prediction control based on the operating condition of the engine, and when the execution condition is met, the control device sets the fuel injection amount command value through feedback control using a correction amount computed based on the output value of the sensor, the control device comprising:
a learning section, wherein, when the execution condition is met, the learning section learns, as a deviation amount learned value, a value obtained by gradually changing a constant deviation amount between the correction amount and its reference value in different manners between a case in which the lift amount is in a first lift amount region used only when the execution condition is not met and a case in which the lift amount is in a second lift amount region used only when the execution condition is met, the learning section computes and stores the relationship between the deviation amount and the lift amount based on the deviation amount learned value;
a correction section that computes a deviation amount correction value from the stored relationship and based on the lift amount, and corrects the fuel injection amount command value using the deviation amount correction value; and
a setting section, wherein, when there is no record of completing learning of the deviation amount when the lift amount is in the first lift amount region, the setting section sets the changing speed of the deviation amount learned value when the lift amount is in the first lift amount region than when there is the record.

6. The control device according to claim 4, wherein the greater the difference between the correction amount and its reference value, the higher the changing speed setting section sets.

7. The control device according to claim 4, wherein the learning section learns the deviation amount learned value at a predetermined interval.

8. The control device according to claim 7, wherein the setting section sets the changing speed higher by shortening the predetermined interval.

9. The control device according to claim 7, wherein the setting section sets the changing speed higher by increasing the changing amount of the deviation amount learned value at the predetermined interval.

10. The control device according to claim 7, wherein, when the number of times the deviation amount learned value is learned is less than a predetermined number of times, it is determined that there is no record.

11. The control device according to claim 10, wherein the internal combustion engine includes an exhaust passage, which discharges the exhaust gas from the engine, the exhaust passage being provided with an exhaust gas purifying catalyst, and
wherein the sensor is located in the exhaust passage downstream of the exhaust gas purifying catalyst in the flowing direction of the exhaust gas.

12. The control device according to claim 11, further comprising a detecting section that detects the deterioration degree of the exhaust gas purifying catalyst,
wherein the greater the detected deterioration degree, the higher the changing speed the setting section sets.

13. The control device according to claim 2, wherein the sensor is a first sensor, and a second sensor, which outputs a signal corresponding to the oxygen concentration of exhaust gas, is provided in the exhaust passage upstream of the exhaust gas purifying catalyst in the flowing direction of the exhaust gas, and
wherein, when the execution condition is met, the control device executes, simultaneously with the feedback control, correction of the fuel injection amount command value based on an output value of the second sensor.

14. The control device according to claim 13, wherein the internal combustion engine includes a plurality of cylinders, and the second sensor is a single sensor shared among all the cylinders.

15. The control device according to claim 4, wherein the setting section does not change the changing speed of the deviation amount learned value when the lift amount is in the second lift amount region regardless of whether there is the record.

16. The control device according to claim 1, wherein the first lift amount region is a first specific lift amount, and the second lift amount region is a second specific lift amount, and
wherein the correction section interpolates the deviation amount correction value from the deviation amount learned values learned separately for the first and second specific lift amounts based on the relationship between the first and second specific lift amounts and the lift amount.

17. The control device according to claim 16, wherein the internal combustion engine further includes an intake passage, which introduces air into the engine, and a throttle valve, which changes the passage area of the intake passage, and the intake air amount is adjusted by the combination of control of the opening degree of the throttle valve and control of the lift amount of the intake valve, and
wherein the first specific lift amount is an upper limit lift amount.

18. The control device according to claim 1, wherein the learning section learns and stores the deviation amount learned value for each of a plurality of previously set regions of the lift amount including the first lift amount region and the second lift amount region, and
wherein the correction section selects one of the regions based on the lift amount and computes the deviation amount learned value corresponding to the selected region as the deviation amount correction value.

19. The control device according to claim 18, wherein the internal combustion engine further includes an intake passage, which introduces air into the engine, and a throttle valve, which changes the passage area of the intake passage, and the intake air amount is adjusted by the combination of control of the opening degree of the throttle valve and control of the lift amount of the intake valve, and
wherein the first lift amount region is a region including an upper limit lift amount.

20. The control device according to claim 1, wherein the execution condition includes a condition for determining whether the temperature of the internal combustion engine is greater than or equal to a predetermined temperature.

* * * * *